US007120874B2

(12) United States Patent  (10) Patent No.: US 7,120,874 B2
Shah et al.  (45) Date of Patent: Oct. 10, 2006

(54) FILTERING GRAPHICAL PROGRAM ELEMENTS BASED ON CONFIGURED OR TARGETED RESOURCES

(75) Inventors: Biren Shah, Austin, TX (US); Stephen Thorne, Austin, TX (US); Matthew Novacek, Austin, TX (US)

(73) Assignee: National Instruments Corporation, Austin, TX (US)

( * ) Notice: Subject to any disclaimer, the term of this patent is extended or adjusted under 35 U.S.C. 154(b) by 769 days.

(21) Appl. No.: 10/174,347

(22) Filed: Jun. 18, 2002

(65) Prior Publication Data

US 2003/0231211 A1  Dec. 18, 2003

(51) Int. Cl.
G06F 15/00 (2006.01)
G06F 13/00 (2006.01)

(52) U.S. Cl. ............. 715/733; 709/223; 715/734; 715/735

(58) Field of Classification Search ........... 715/733, 715/765, 763; 714/24, 25; 709/203, 223
See application file for complete search history.

(56) References Cited

U.S. PATENT DOCUMENTS 5,784,275 A  7/1998  Sojoodi et al.
5,920,479 A  7/1999  Sojoodi et al.
6,064,812 A  5/2000  Parthasarathy et al.
6,437,805 B1  8/2002  Sojoodi et al.
6,738,933 B1 *  5/2004  Fraenkel et al. ............ 714/47
6,788,315 B1 *  9/2004  Kekic et al. ................ 715/733

* cited by examiner

Primary Examiner—Cao (Kevin) Nguyen
(74) Attorney, Agent, or Firm—Meyertons Hood Kivlin Kowert & Goetzel, P.C.; Jeffrey C. Hood; Mark S. Williams

(57) ABSTRACT

System and method for filtering attributes of a graphical program element (GPE) in a graphical program or diagram, e.g., a property node, menu, property page, icon palette, etc., based on targeted or configured resources. Input is received specifying or selecting a filter option from presented filter options. The filter options include 1) display all attributes of the GPE; 2) display attributes of the GPE associated with configured resources; and 3) display attributes of the GPE associated with selected configured resources. User input is received to access the GPE. Attributes for the GPE associated with the resources are retrieved from the database and displayed in accordance with the selected filtering option. The filtered attributes of the element are then selectable by a user for various operations, e.g., to configure the graphical program, to configure resources, to initiate a purchase or order for the resources, and/or to install the resources, among others.

55 Claims, 19 Drawing Sheets

FILTERING GRAPHICAL PROGRAM ELEMENTS BASED ON CONFIGURED OR TARGETED RESOURCES

FIELD OF THE INVENTION

The present invention relates to the fields of graphical programming and measurement and automation systems, and more particularly to a system and method for filtering attributes of graphical program elements in a graphical program based on configured or targeted hardware and/or software resources in the system.

DESCRIPTION OF THE RELATED ART

Scientists and engineers often use measurement or automation systems to perform a variety of functions, including measurement of a physical phenomena or unit under test (UUT), test and analysis of physical phenomena, simulation, hardware-in-the-loop testing, process monitoring and control, control of mechanical or electrical machinery, data logging, laboratory research, and analytical chemistry, to name a few examples.

A typical measurement system comprises a computer system with one or more measurement devices or measurement hardware. The measurement device may be or include a computer-based instrument, a data acquisition device or board, a programmable logic device (PLD), a sensor, a smart sensor, an actuator, or other type of device for acquiring or generating data. The measurement device may be a card or board plugged into one of the I/O slots of the computer system, or a card or board plugged into a chassis, or an external device. For example, in a common measurement system configuration, the measurement hardware is coupled to the computer system via other means such as through a VXI (VME eXtensions for Instrumentation) bus, a PXI (PCI eXtensions for Instrumentation) bus, a GPIB (General Purpose Interface Bus), a serial port, or parallel port of the computer system. Optionally, the measurement system includes signal conditioning devices which receive the field signals and condition the signals to be acquired. A measurement system may also typically include transducers, sensors, actuators or other detecting (or generating) means for providing "field" electrical signals representing a process, physical phenomena, equipment being monitored or measured, etc. The field signals are provided to the measurement hardware.

Traditionally, high level text-based programming languages have been used by programmers in writing application programs. Many different high level programming languages exist, including BASIC, C, Java, FORTRAN, Pascal, COBOL, ADA, APL, etc. Programs written in these high level languages are translated to the machine language level by translators known as compilers or interpreters. The high level programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

Examples of fields in which computer systems are employed to interact with physical systems are the fields of instrumentation, process control, industrial automation, and simulation. Computer measurement and control of devices such as instruments or industrial automation hardware has become increasingly desirable in view of the increasing complexity and variety of instruments and devices available for use. However, due to the wide variety of possible testing and control situations and environments, and also the wide array of instruments or devices available, it is often necessary for a user to develop a custom program to control a desired system.

As discussed above, computer programs used to control such systems traditionally had to be written in text-based programming languages such as, for example, assembly language, C, FORTRAN, BASIC, etc. Traditional users of these systems, however, often were not highly trained in programming techniques and, in addition, text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered a higher and more intuitive way in which to interact with a computer. A graphically based programming environment can be represented at a level above text-based high level programming languages such as C, Basic, Java, etc.

The method disclosed in Kodosky et al allows a user to construct a diagram using a block diagram editor. The block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled and executed or interpreted by a computer, or alternatively deployed and executed on a programmable hardware device, such as a Field Programmable Gate Array (FPGA).

Therefore, Kodosky et al teaches a graphical programming environment wherein a user places or manipulates icons and interconnects or "wires up" the icons in a block diagram using a block diagram editor to create a graphical "program." A graphical program for performing an instrumentation, measurement or automation function, such as measuring a Unit Under Test (UUT) or device, controlling or modeling instruments, controlling or measuring a system or process, or for modeling or simulating devices, may be referred to as a virtual instrument (VI). Thus, a user can create a computer program solely by using a graphically based programming environment. This graphically based programming environment may be used for creating virtual instrumentation systems, modeling processes, control, simulation, and numerical analysis, as well as for any type of general programming.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program or VI, and may include other icons which represent devices being controlled. The front panel may be comprised in a single window of user interface elements, or may comprise a plurality of individual windows each having one or more user interface elements, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel may comprise front panel objects, e.g., the GUI, embedded in the block diagram.

During creation of the block diagram portion of the graphical program, the user may select various function nodes or icons that accomplish his desired result and connect the function nodes together. For example, the function nodes may be connected in one or more of a data flow, control flow, and/or execution flow format. The function nodes may also be connected in a "signal flow" format, which is a subset of data flow. The function nodes may be connected between the terminals of the various user interface elements, e.g., between the respective controls and indicators. Thus the user may create or assemble a graphical program, referred to as a block diagram, graphically representing the desired process. The assembled graphical program may be represented in the memory of the computer system as data structures and/or program instructions. The assembled graphical program, i.e., these data structures, may then be compiled or interpreted to produce machine language that accomplishes the desired method or process as shown in the block diagram.

Input data to a graphical program may be received from any of various sources, such as from a device, unit under test, a process being measured or controlled, another computer program, or from a file. Also, a user may input data to a graphical program or virtual instrument using a graphical user interface, e.g., a front panel as described above. The input data may propagate through the data flow block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the front panel may be used merely to view the input and output, or just the output, and the input may not be interactively manipulable by the user during program execution.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, image processing/machine vision applications, and motion control, among others.

In some prior art systems, a user may manually or programmatically access various parameters associated with the graphical program, e.g., through nodes, icons, menus, and property pages, among others. For example, one or more parameters of a device, control or indicator, may be accessed through the use of property nodes, also referred to as attribute nodes. For another example, parameters may be accessed through a menu, or a palette of icons which may present a number of selectable items or attributes to the user. Property nodes may also be used to get/set properties about the current application or other objects in the development environment, e.g., LabVIEW. Additionally, property nodes may also be used to get/set values to/from another VI.

In a property node example, the user may create or select a property node corresponding to a control containing one or more attributes that affect parameters of the control, such as the color used for the respective display, the visibility of the control, the scales or cursor position for respective graphs or charts, etc. The parameters which can be programmatically accessed are referred to as attributes or properties. In this manner, for example, a user can programmatically make changes that affect the output or appearance of controls and indicators, as well as programmatically configure other objects or devices referenced by the graphical program. A user can also access these parameters interactively during execution of a block diagram.

Thus, a property node may be associated with a control on the front panel and operate to provide a more meaningful visual output to the user. Alternatively, the property node may be associated with a wide variety of objects, including, for example, other graphical programs, devices, and/or channels. The purpose of a property node is to provide a configuration interface for an object or device which is associated with or part of the graphical program. In other words, property nodes are objects that may be added to the block diagram to get/set properties of a front panel object (numeric, slider . . . etc), or to get/set properties of a data acquisition board/device. For example, a property node may affect the visual output of a control provided on the front panel depending on events which occur during execution of a VI or on user input during execution of a VI.

A property node typically allows at least two types of operations, these being reading from a property node or writing to a property node. These operations of reading and writing an attribute can be performed either by a block diagram during execution, where the user has programmed the block diagram to perform this function, or interactively by the user during execution. The process of writing to a property node refers to the execution subsystem updating an attribute of the associated device or object, e.g., updating a function control in the front panel display to reflect an attribute that has been set programmatically (or manually) in a block diagram. The user can also "write" to an attribute by providing input to or manipulating a control in the front panel during execution of a block diagram. Reading a property node refers to the execution subsystem reading the value of an attribute for a certain device or control during block diagram execution that may have been changed by the user, or may have been changed during execution of a VI by the execution subsystem. The user can also view changes to the attribute during execution. Some attributes can be changed by a user and practically all can be changed by the execution subsystem. Therefore, during execution of a VI, the process of writing to a property node may correspond to configuring a device or object, e.g., changing the front panel display and thus affecting what the user actually sees. The step of reading a property node does not actively change the configuration of the device or object, e.g., the front panel, but allows the program to see how the user or block diagram is changing the device or object. In other embodiments, reading and writing to a property node may be used to interact with or communicate with the device or object associated with the property node.

Each property node may be used with a number of different objects whose attributes may overlap, but typically differ to some degree. Each property node thus has a superset of the attributes of each object, device, or function associated with that property node, where the superset can easily have hundreds or even thousands of possible attributes. Thus, for a given task, there may be hundreds of properties a user can set and get depending on the kind of measurement and the type of device configured. When a user configures a property node for use in a graphical program, the entire superset is generally presented to the user, who must then select from the many attributes those he wishes to access (read or write) in the graphical program.

Similarly, the number of icons in a palette, or the number of items in a menu or other graphical program element may be quite large, depending on the number of scenarios to which the element is applicable. However, due to the potentially overwhelming number of possible attributes which may be presented to the user, it is often difficult and/or tedious for the user to sort through the possible attributes (icons or items) to locate those which are germane to the task at hand.

In some systems, a configuration diagram is used to represent the system, where graphical elements in the configuration diagram respectively represent resources in the system, where the configuration diagram may not only illustrate the configuration of the system, but may also be used to configure the system. The issues presented above with respect to graphical program elements in a graphical program also apply to graphical elements in a configuration diagram.

In some graphical programs, VI reference nodes may be used to access attributes for a VI. These reference nodes are generally typed dynamically, i.e., at run time, and so there may be some risk of type conflicts which may not be apparent until the program is executed. Thus, dynamic typing of VI reference nodes may allow the introduction of configuration errors in the system.

Therefore, it would be desirable to provide new systems and methods for filtering properties or attributes of graphical elements in graphical diagrams, such as graphical programs and/or configuration diagrams.

SUMMARY OF THE INVENTION

Various embodiments of a system and method are presented for filtering attributes of graphical elements in a graphical diagram based on configured or targeted devices and/or software in the system. As used herein, the term "graphical diagram" may refer to both a graphical program and/or a configuration diagram. The attributes of a graphical element may refer to icons in a palette, items in a menu, and/or attributes of a property node, among others. The system includes a computer system which is operable to store and execute program instructions according to the present invention, including, for example, a graphical programming development environment whereby a user may create a graphical program to perform a task, such as a measurement task. The system may also include one or more devices, e.g., measurement devices, for use in conjunction with the graphical program to perform the task, as well as programs and/or data. In one embodiment, the graphical program may be deployed and executed on a programmable hardware element, e.g., a field programmable gate array (FPGA). The graphical program may include one or more graphical program elements, such as property nodes, palettes, and menus, which may be used to configure the graphical program, for example, by setting/getting parameters for graphical controls, programs, and/or devices of the system. Thus, the system may include various resources, including hardware, software, and/or data, for use by the system in performing a task.

In one embodiment, the system may include a configuration diagram which represents the system with graphical elements that represent respective configured or targeted resources of the system, and the attribute filter may be applicable to the graphical elements of the configuration diagram. As used herein, the term "graphical program element" may also refer to a graphical element in the configuration diagram. Thus, the graphical diagram may comprise a configuration diagram representing one or more resources in the system. Where the system is a measurement system, the configuration diagram may be useable to configure the one or more resources to perform a measurement task.

In one embodiment, user input may be received specifying an element filter option, e.g., a property node filter option, from a plurality of element filter options. For example, a graphical user interface (GUI) may be displayed which presents the plurality of filter options, where the GUI receives the user input specifying a particular filter option. User input may also be received initiating access to the graphical program element, e.g., the property node. For example, the user may left-click on the property node icon in the graphical diagram with a mouse or other pointing device. The relevant attributes of the property node may then be displayed based on the specified filter option. The attributes of the property node may then be selectable by a user to configure the graphical diagram. In an embodiment where the system includes a configuration diagram, the attributes may be useable by the configuration diagram to configure the system, e.g., to perform the task.

In an embodiment where the graphical program element is a palette, the GUI may receive user input initiating access to the palette, such as a left-click on a palette icon in the graphical diagram with a mouse, or selection of an item from a menu. The attributes of the palette, in this case, one or more icons representing resources of the system, may then be displayed based on the selected filter option. The icons presented may then be selectable by the user for various operations, e.g., configuration of the resources associated with the icons, or, in an embodiment where the filtered icons represent proposed resources for the system, the icons may be selectable by the user to initiate a purchase/order of the resources from a vendor, i.e., to acquire the proposed resources.

In the property node example, the property node filter options presented to the user may include two or more of: a first option indicating that all attributes of the property node are to be displayed; a second option indicating that attributes of the property node associated with configured resources are to be displayed; a third option indicating that attributes of the property node associated with selected configured resources are to be displayed, and a fourth option indicating that attributes of selected offline resources are to be displayed.

When the first option is selected, indicating that all attributes of the property node are to be displayed, displaying the relevant attributes of the property node may include retrieving all attributes for the property node, and displaying the retrieved attributes.

In an embodiment where the graphical diagram is a graphical program, a user may configure one or more resources, e.g., devices, for use in conjunction with the graphical program prior to providing user input specifying a property node filter option. In an embodiment where the system includes one or more configured resources, when the second option is selected indicating that attributes of the property node associated with the one or more configured resources are to be displayed, displaying the relevant attributes of the property node may include retrieving resource IDs, e.g., device IDs, for the one or more configured resources from a database, retrieving attributes for the property node corresponding to the one or more configured resources from the database, and displaying the retrieved attributes.

When the third option is selected, indicating that attributes of the property node associated with a selected one or more of the configured resources are to be displayed, resource IDs for the configured resources may be retrieved from a database and a list of the configured resources may be displayed. User input selecting one or more of the configured resources may be received, and attributes for the property node corresponding to the selected one or more configured resources may be retrieved, e.g., from the database, and displayed.

When the fourth option is selected, indicating that attributes of the property node associated with a selected one or more offline resources are to be displayed, resource IDs for the offline resources may be retrieved from a database and a list of the offline resources may be displayed. User input selecting one or more of the offline resources may be received, and attributes for the property node corresponding to the selected one or more offline resources may be retrieved, e.g., from the database, and displayed.

In one embodiment, an initial list of attributes associated with one or more configured resources (although not associated with any particular property node) may be cached, and used in subsequent invocations of the method. Similarly, a list of offline resources and/or offline resource attributes may be cached. For example, if the user has selected the second or third option above, then accessed the property node, the cached list may be retrieved, then traversed to extract those attributes associated with the type of the property node. The resulting attributes are then associated with both the configured resources and the property node type. The cached list may be refreshed or updated upon changes to the resource configuration of the system and/or a change in the filter option, or upon invocation of the filter options control, i.e., menu, dialog box, pop-up window, etc.

Once the (filtered) attributes for the property node have been displayed to the user, user input may be received specifying at least one of the displayed relevant attributes of the property node, thereby configuring the graphical diagram, e.g., the graphical program, with the at least one property node attribute. For example, consider a DAQ (data acquisition) Read property node wired to a data acquisition channel node: if the user selects a timeout attribute of the property node and sets the timeout attribute to write, then upon execution of the graphical program, the property node's timeout attribute value will be set to a value provided to a control for that attribute. In other words, the value (set in the control, or alternatively, by another node/device, if wired appropriately) may be written to the property node, and therefore applied to the channel to which it is wired, setting the timeout parameter for that channel.

In another embodiment, icons from a palette may be presented for selection by a user rather than attributes of a property node, where the icons may be considered to be attributes for the measurement system. For example, icons representing configured or targeted resources, e.g., devices and/or programs, in the system may be selectable for installation of software for performing a task. The icons may be filtered to include only those related to the current task. For another example, icons representing software to be installed may be filtered to present only those corresponding to hardware currently configured on the system, or targeted by the system for the specified task. It is noted that the filtering concepts may be applied to any other graphical program elements, as well, including property page items, reference nodes, and menus, among others.

In an embodiment where the graphical diagram is a configuration diagram for a measurement system, the configuration diagram may include one or more graphical elements representing one or more proposed resources in the measurement system. In one embodiment, configuring the one or more resources to perform the measurement task may include acquiring, e.g., ordering and/or purchasing, the one or more proposed resources, and configuring the one or more acquired resources to perform the measurement task upon installation of the resources. In one embodiment, the configuration diagram may be generated based on a graphical program for performing the task.

In one embodiment, the filtering of graphical elements may be applied to VI references. In particular, interaction with controls and indicators of a VI running asynchronously may be managed while the values read and written are strictly typed to the data type of the control. This approach may eliminate the overhead associated with dynamic invocation, and may thus improve efficiency of the system. This approach may be particularly useful in communicating with FPGA targeted VIs, where the overhead of dynamic calls in relation to the number of parameters passed in fast control loops entails significant overhead. Additionally, FPGA VI's often have more controls and indicators than are supported by a connector pane, thereby preventing the use of the call by reference node for those attributes not included in the connector pane. However, it should be noted that the approach described below is not limited to FPGA applications, but is broadly applicable to multi-platform development and use, providing a generic means for communication with graphical programs running on a variety of platforms with improved code readability. For example, in contrast to the prior art methods where a VI reference node may be dynamically typed, e.g., typed to a connector pane, at run time, the VI references may be statically bound to a specific VI.

For example, in an exemplary graphical program, i.e., block diagram, an open reference node may be added to open a reference to a yet-to-be-defined VI, similar to the prior art open reference node; however, in accordance with the present invention, all configuration may be made from the node's context menu and associated dialogs, rather than from wired inputs to the node. This ensures that the configuration is defined at edit time, rather than at run time, allowing the VI call to be statically bound to the VI. After the open reference node has been placed in the block diagram, a target platform may be selected, i.e., the platform on which the VI should be opened. The presented target platform options may include, but are not limited to, opening the VI reference on the local host machine, a remote machine on the network, or on a programmable hardware element, such as an FPGA. This information may be included in the refnum output of the node for use by other nodes in their respective configuration. In one embodiment, a default target platform type may be provided by the node, e.g., the first listed target platform type. An option may also be presented for specification of a target VI. In other words, the user may be allowed to select the particular VI for reference by the open reference node.

In response to user input selecting the option to select a target VI for the open reference node, a graphical user interface, e.g., a dialog box, may be presented for receiving user input specifying the target VI, for example, a text entry field for entering a path, or a browsing mechanism which allows the user to browse the system (or other networked systems) for the target VI. Thus, the open reference node may be typed at "edit time", and may thence be configured in the graphical program without the risks associated with run time typing.

The typed open reference node may then be connected to other graphical elements in the program, e.g., a loop, e.g., by the user "wiring" the outputs of the node to the loop. The node icon may be changed to reflect the referenced VI, i.e., the "add" function.

An access node, such as a read, write, or property node, may then be added to the graphical program for accessing the controls and indicators of the referenced VI. When the refnum input of the access node is wired to the output of the open reference node, the access node may adapt to the type of the refnum, outputting the same refnum type and determining the controls/indicators that are valid for the currently selected VI. Terminals may be added to the access node, and for each terminal the associated control on the target VI may be selected. Because the access node is coupled to the selected VI, any of the controls and indicators of the selected VI may be available, including those not on the connector pane (the public interface). The data type of each terminal is explicitly set to the type of the control, rather than simply a variant or flattened string.

An attribute may then be selected for access by the access node. The attributes presented by the access node may be filtered to include those attributes which correspond to the type of the selected VI, for example, two arguments, x and y, and their sum, as well as a stop control and a delete option. Numeric terminals for the attributes of the referenced VI, e.g., a read of "x", and a write of "x+y", may then be used by other nodes of the graphical program to respectively read and write the corresponding attributes of the referenced VI.

If the VI selection made on the open reference node is changed, the refnum output by that node may change appropriately. In response to this change in type, any access nodes (read, write, or property nodes) connected to the refnum terminal may change their respective refnum outputs and check the new refnum type against their selected controls. If any of the selected control names are no longer valid, the corresponding terminal may be removed from the node and the wire connected from that terminal may be invalidated, breaking the diagram. In this manner, the user may never have an invalid configuration selected on their diagram. Thus, the static typing of the open reference node to that of the selected VI may prevent errors in the configuration of VIs in the graphical program which do not become apparent until run time. Additionally, the explicit selection of the target platform for the VI may provide a means for target specific syntax checking, thereby preventing incompatible VI/platform configurations.

Thus, various embodiments of the systems and methods described above may be used to simplify the configuration process for a user of a measurement system or any other system which employs graphical elements to configure a graphical diagram and/or controls and devices used by the graphical diagram. The graphical diagram may be a graphical program or a configuration diagram. More specifically, various embodiments of the systems and methods described herein allow a user to specify any of a variety of options for filtering the displayed attributes of a graphical programming element in the graphical diagram, thereby reducing the effort required by the user to configure controls and/or devices associated with the graphical element. Thus, in various embodiments, the present invention provides various embodiments of a system and method for filtering attributes of graphical program elements in a graphical program or configuration diagram based upon configured and/or targeted software and/or devices in the system.

BRIEF DESCRIPTION OF THE DRAWINGS

A better understanding of the present invention can be obtained when the following detailed description of the preferred embodiment is considered in conjunction with the following drawings, in which.

Figure 1A:
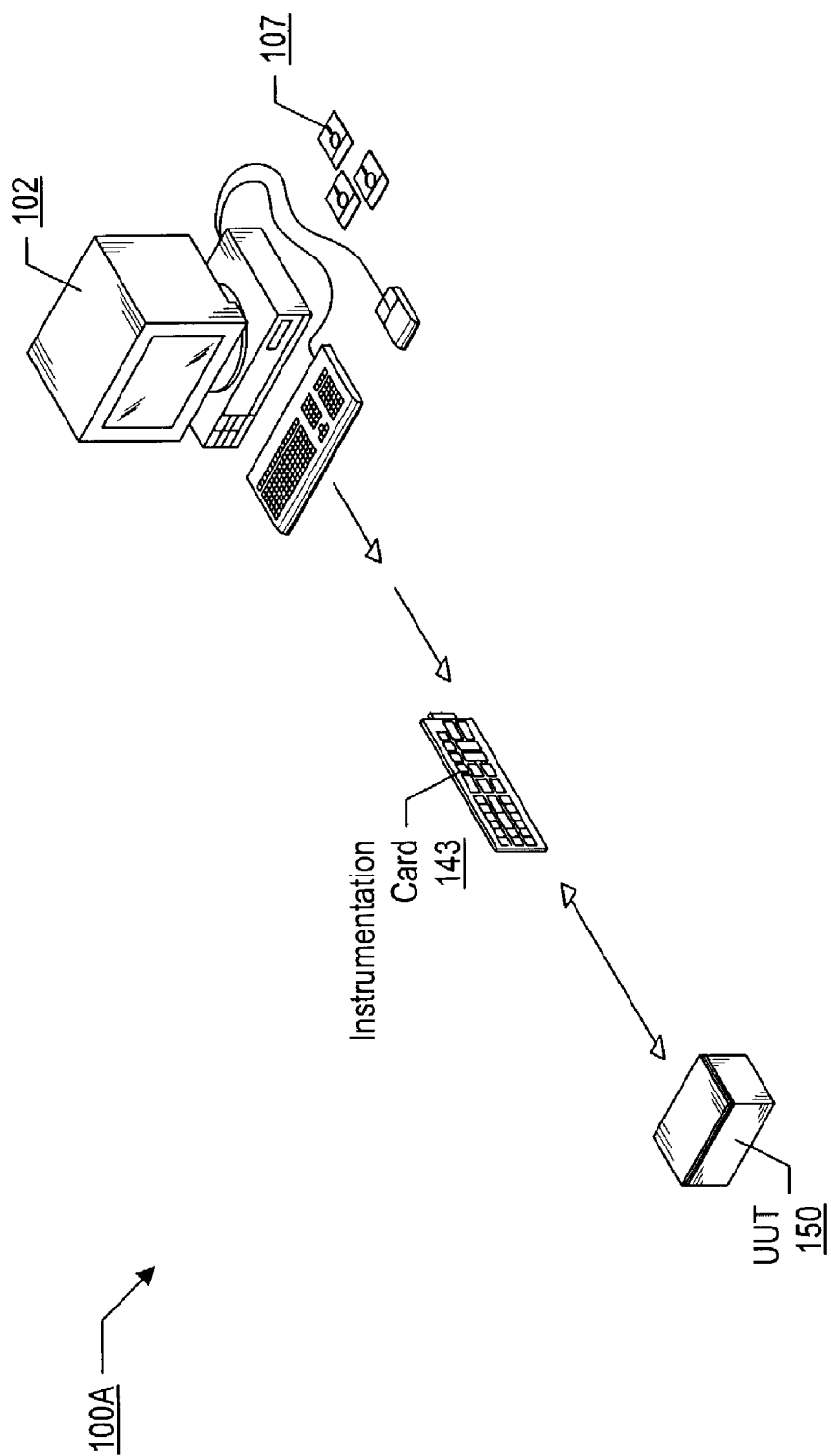
FIGS. 1A–1C illustrate representative instrumentation and process control systems including various I/O interface options.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. patent application Ser. No. 09/617,600 titled "Graphical Programming System with Distributed Block Diagram Execution and Front Panel Display," filed Jun. 13, 2000.

U.S. patent application Ser. No. 09/518,492 titled "System and Method for Programmatically Creating a Graphical Program," filed Mar. 3, 2000.

U.S. patent application Ser. No. 09/745,023 titled "System and Method for Programmatically Generating a Graphical Program in Response to Program Information," filed Dec. 20, 2000.

U.S. application Ser. No. 10/113,987 titled "A Configuration Diagram Which Displays a Configuration of a System" filed Apr. 1, 2002, whose inventors were Jeffrey L. Kodosky, Darshan Shah and Steven W. Rogers.

U.S. application Ser. No. 10/177,553, titled "Target Specific Syntax Defining and Checking", filed Jun. 21, 2002, whose inventors were Newton G. Petersen and Darshan K. Shah.

The LabVIEW and BridgeVIEW graphical programming manuals, including the "G Programming Reference Manual", available from National Instruments Corporation, are also hereby incorporated by reference in their entirety.

Figure 1B:
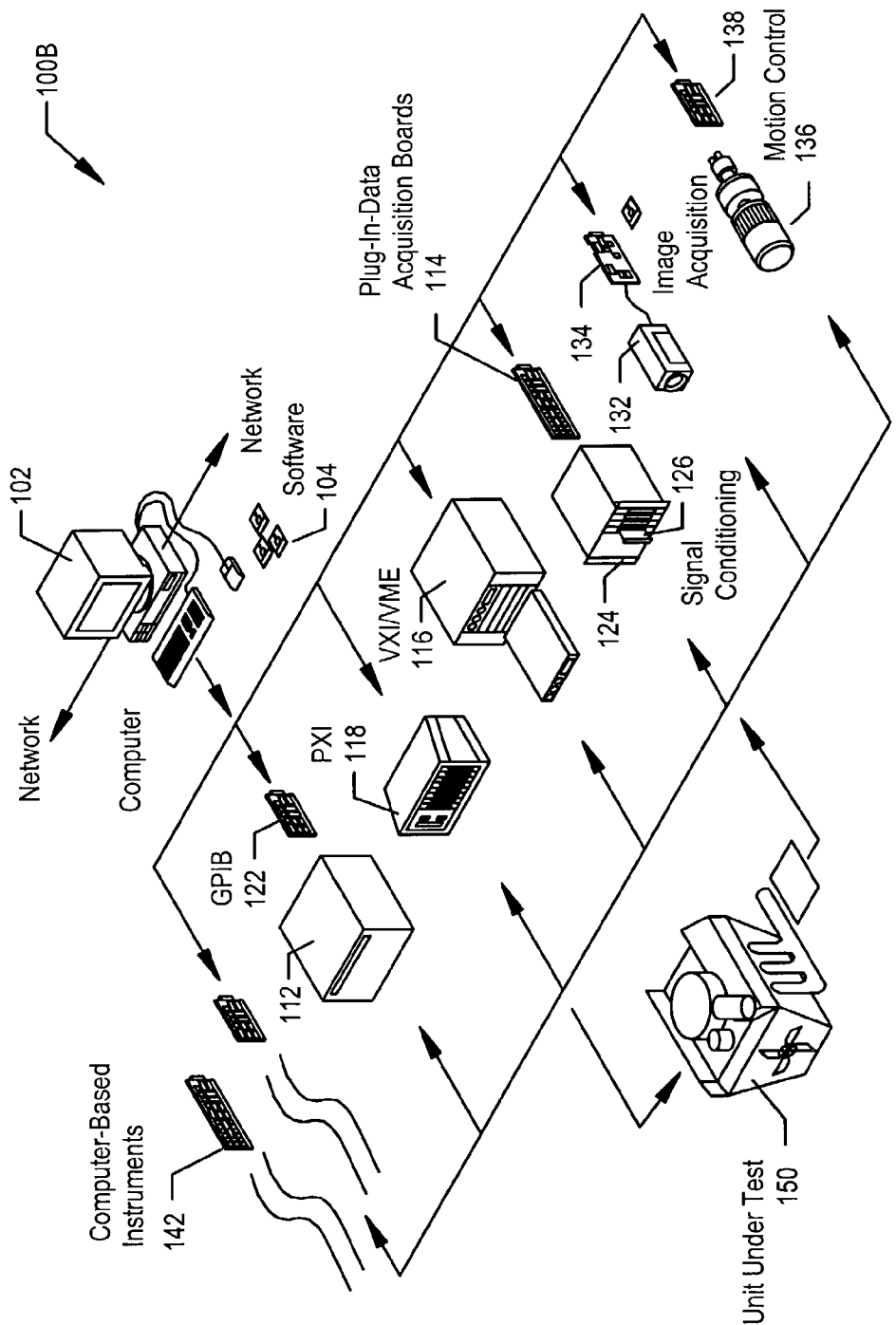
Figure 1C:
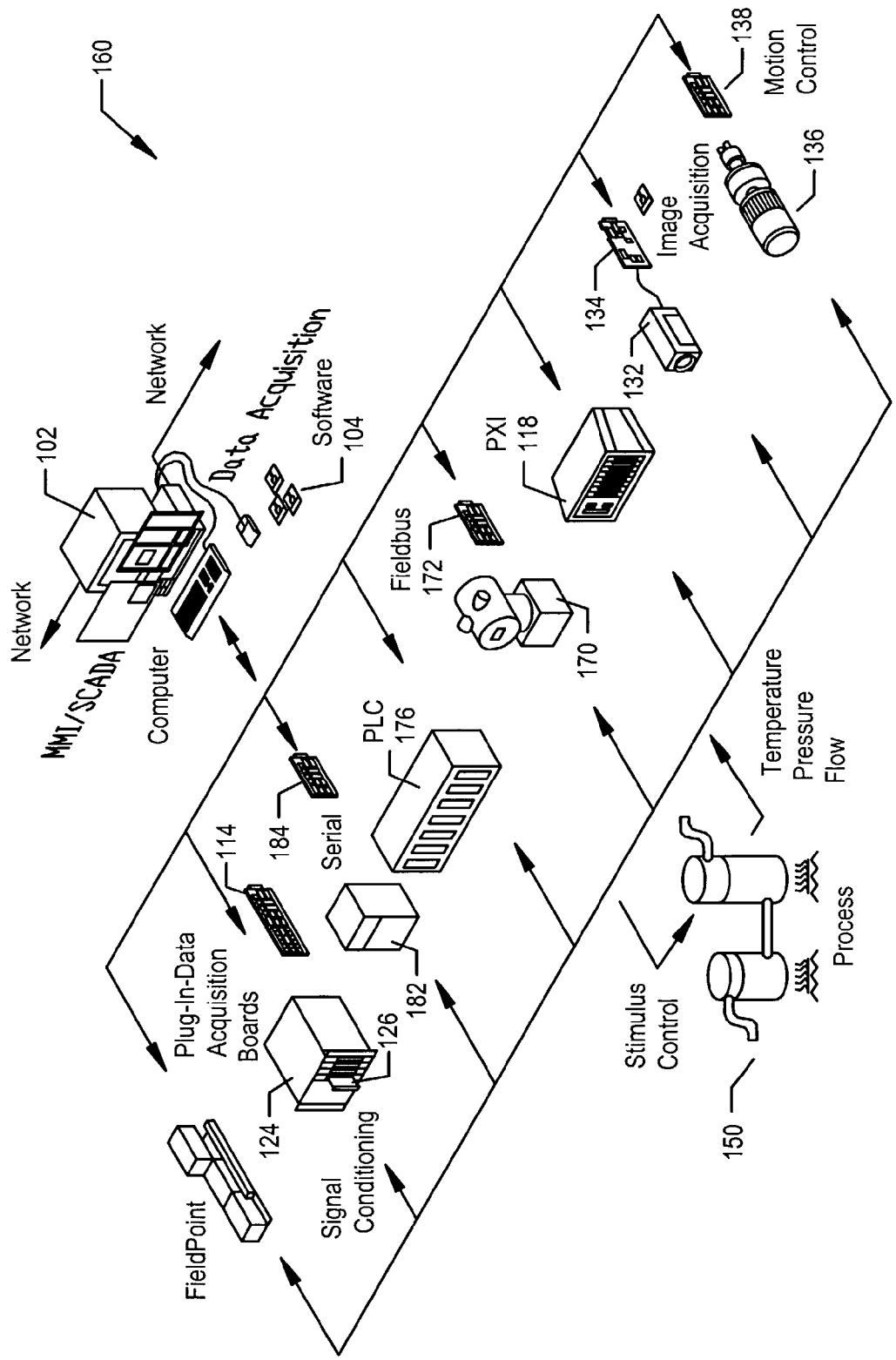

FIGS. 1A–1C—Instrumentation and Industrial Automation Systems

FIGS. 1A–1C illustrate exemplary measurement and automation systems. As used herein, the term "measurement system" is intended to include the types of measurement systems and automation systems shown in FIGS. 1A–1C, as well as other types of systems. The measurement system may be a single measurement device system as shown in FIG. 1A, an instrumentation system such as that shown in FIG. 1B, an industrial automation system such as that shown in FIG. 1C, or a modeling or simulation system involved with the design, validation or testing of a product involving "real world I/O", i.e., the acquisition or generation of data to/from a model or simulation of a device or product being designed, validated or tested, such as hardware-in-the loop validation. The term "measurement" may include instrumentation measurement, data acquisitions, automation, control, and simulation. The measurement systems shown in FIGS. 1A–1C may include software programs according to various embodiments of the present invention. These programs may of course be stored in or used by other types of systems as desired. In accordance with one embodiment of the present invention, the present system and method includes novel software programs for filtering, displaying, and specifying attributes of graphical elements in a graphical diagram, such as a graphical program and/or a configuration diagram, as described below in more detail.

FIG. 1A illustrates an exemplary measurement system 100A comprising a host computer 102 which connects to a measurement device, in this example, an instrumentation card 143. It should be noted that the instrumentation card 143 is but one example of a measurement device suitable for using the present invention. For example, in other embodiments, the measurement device may be a stand-alone device, such as an oscilloscope, or a chassis, e.g., a PXI chassis, which contains one or more PXI instrumentation cards. The host computer 102 connects through the measurement device 143 to analyze, measure, or control a unit under test (UUT) or process 150. Thus, the measurement device 143 may be operable to receive signals from the UUT 150, process the signals, and send the signals to the host computer system 102, where the signals may be processed further, analyzed, stored, and/or transmitted to other systems, as desired. Conversely, in another embodiment, the measurement device 143 may be operable to receive commands or requests from the host computer 102, and generate a signal to the UUT 150, e.g., for excitation or stimulation. Thus, the measurement device 143 may be a signal acquisition and/or a signal generation device, as desired. The measurement device 143 may include a plurality of components, such as multiplexers (MUXs), counters, I/O terminals, etc., for routing and/or controlling signals communicated between the UUT 150 and the host computer 102. Various parameters of the measurement device 143 may be configured programmatically via property nodes or other graphical elements in a graphical program or configuration diagram, as will be described in more detail below.

FIG. 1B illustrates an exemplary instrumentation control system 100B. The system 100B may comprise host computer 102 which connects to one or more devices or instruments. The host computer 102 may comprise a CPU, a display, memory, and one or more input devices such as a mouse or keyboard, as shown. The host computer 102 connects through the one or more instruments to analyze, measure, or control a unit under test (UUT) or process 150.

The host computer 102 may execute a program which interacts with or controls the one or more instruments. The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition card 134, a motion control device 136 and associated motion control interface card 138, and/or one or more computer based instrument cards 142, among other types of devices. Note that the computer based instrument card 142 may be a board or card with one or more FPGAs, one or more CPUs and memory, or various combinations of the two.

The GPIB instrument 112 may be coupled to the computer 102 via the GPIB interface card 122 provided by the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and may interface through signal conditioning circuitry 124 to the UUT. The signal conditioning circuitry 124 may comprise an SCXI (Signal Conditioning extensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes. These cards 122, 134, 138, 114 may also connected to the computer 102 through a USB (Universal Serial Bus), IEEE 1394 or 1394.2 bus provided by the computer 102.

The VXI chassis or instrument 116 may be coupled to the computer 102 via a VXI bus, MXI bus, or other serial or parallel bus provided by the computer 102. The computer 102 may include VXI interface logic, such as a VXI, MXI or GPIB interface card (not shown), which interfaces to the VXI chassis 116. The PXI instrument may be coupled to the computer 102 through the computer's PXI bus. The PXI chassis may be coupled to the computer 102 via a MXI-3 bus.

A serial instrument (not shown) may also be coupled to the computer 102 through a serial port, such as an RS-232 port, USB (Universal Serial bus) or IEEE 1394 or 1394.2 bus, provided by the computer 102.

In typical instrumentation control systems an instrument of each interface type may not be present, and in fact many systems may only have one or more instruments of a single interface type, such as only GPIB instruments. The instruments are coupled to the unit under test (UUT) or process 150, or are coupled to receive field signals, typically generated by transducers. The system 100B may be used in a data acquisition and control application, in a test and measurement application, a process control application, a man-machine interface application, or a simulation application.

FIG. 1C illustrates an exemplary industrial automation system 160. The industrial automation system 160 may be similar to the instrumentation or test and measurement system 100B shown in FIG. 1B. Elements which are similar or identical to elements in FIG. 1B have the same reference numerals for convenience. The system 160 comprises a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as MMI (Man Machine Interface), SCADA (Supervisory Control and Data Acquisition), portable or distributed data acquisition, process control, advanced analysis, or other control. In FIG. 1C, the computer 102 may execute a program that is involved with the automation function performed by the automation system 160.

The one or more devices may include a data acquisition board 114 and associated signal conditioning circuitry 124, a PXI instrument 118, a video device 132 and associated image acquisition card 134, a motion control device 136 and associated motion control interface card 138, a FieldBus device 170 and associated FieldBus interface card 172, a PLC (Programmable Logic Controller) 176, a serial instrument 182 and associated serial interface card 184, or a distributed data acquisition system, such as the FieldPoint system available from National Instruments, among other types of devices.

The DAQ card 114, the PXI chassis 118, the video device 132 and image acquisition card 134, and the motion control device 136 and motion control interface card 138 may be coupled to the computer 102 as described above. The serial instrument 182 may be coupled to the computer 102 through a serial interface card 184, or through a serial port, such as an RS-232 port, provided by the computer 102. The PLC 176 may couple to the computer 102 through a serial port, Ethernet port, or a proprietary interface. The FieldBus interface card 172 may be comprised in the computer 102 and interfaces through a FieldBus network to one or more FieldBus devices. Each of the DAQ card 114, the serial card 184, the FieldBus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 1A–1C, the computer system 102 and/or one or more of the instruments or devices may include a memory medium (or memory mediums) on which software according to the present invention may be stored. The memory medium may store one or more programs and data which implement various embodiments of the present invention, as will be described below in more detail.

The term "memory medium" is intended to include an installation medium, e.g., a CD-ROM, floppy disks 104, or tape device; a computer system memory or random access memory such as DRAM, SRAM, EDO RAM, RRAM, etc.; or a non-volatile memory such as a magnetic media, e.g., a hard drive, or optical storage. The memory medium may comprise other types of memory as well, or combinations thereof.

In addition, the memory medium may be located in a first computer in which the software of the present invention stored or executed, or may be located in a second different computer which connects to the first computer over a network, such as the Internet. In the latter instance, the second computer may provide the program instructions to the first computer for execution, or may store a database which is accessible by the first computer, and which provides data in accordance with the present invention. Also, the computer system 102 may take various forms, including a personal computer system, mainframe computer system, workstation, network appliance, Internet appliance, personal digital assistant (PDA), television set-top box, instrument, or other device. In general, the term "computer system" can be broadly defined to encompass any device having at least one processor which executes instructions from a memory medium.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

In one embodiment, the software programs and software architecture as described herein may be designed for measurement systems, including data acquisition/generation, analysis, and/or display; automation systems; simulation systems; systems for controlling, modeling, or simulating instrumentation or industrial automation hardware; and sys tems for controlling, modeling or simulating systems or devices being designed, prototyped, validated or tested. However, it is noted that the present invention can be used for a plethora of applications and is not limited to measurement, instrumentation, or industrial automation applications. In other words, FIGS. 1A–1C are exemplary only, and the software programs and software architecture may be used for any of various purposes and may be stored in and execute on any of various types of systems to perform any of various applications.

Figure 2:
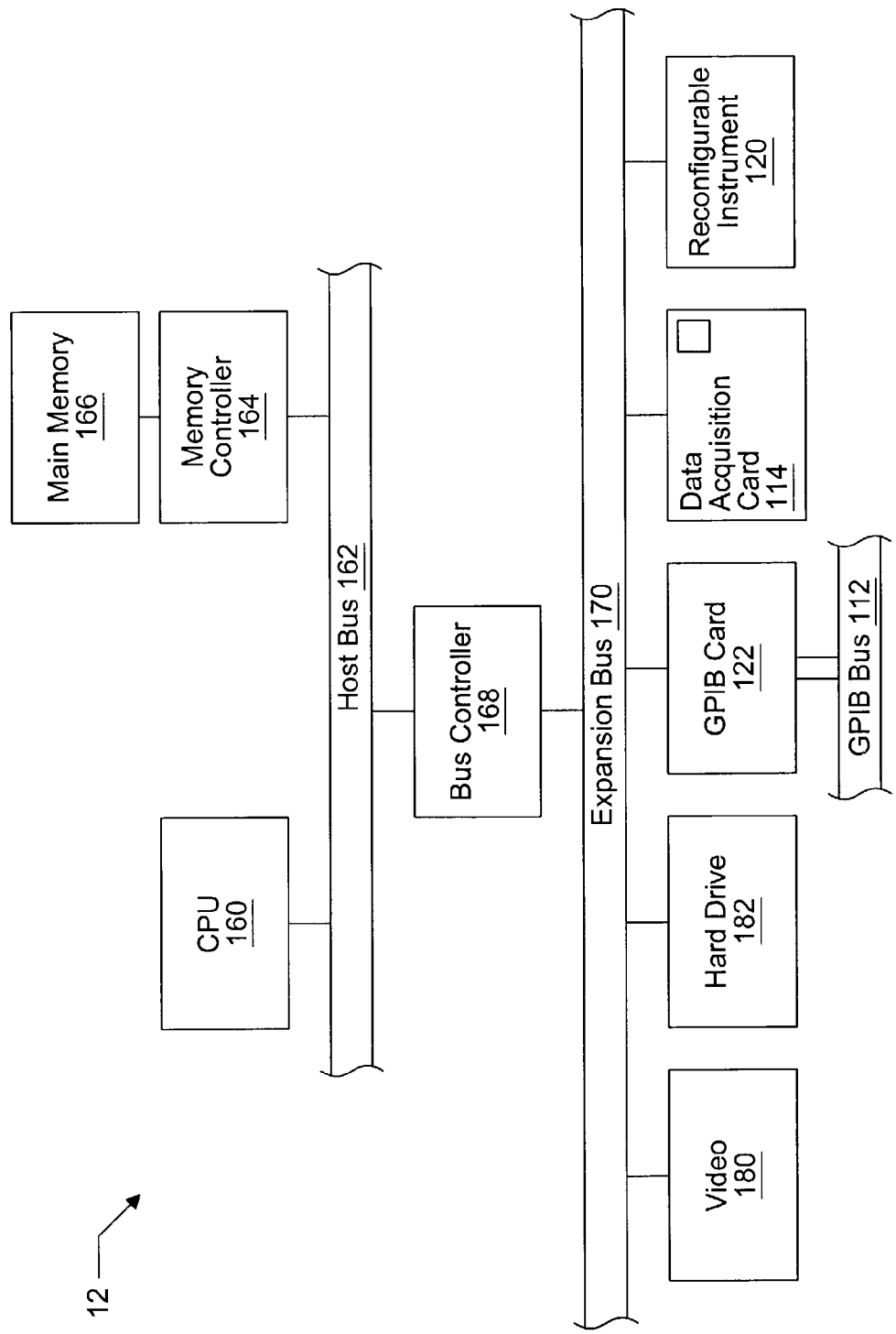
FIG. 2 is a block diagram of the computer system of FIGS. 1A–1C.

FIG. 2—Computer System Block Diagram

FIG. 2 is an exemplary block diagram of the computer system illustrated in FIGS. 1A–1C. It is noted that any type of computer system configuration or architecture can be used in conjunction with the system and method described herein, as desired, and FIG. 2 illustrates a representative PC embodiment. It is also noted that the computer system may be a general purpose computer system such as illustrated in FIGS. 1A–1C, a computer implemented on a VXI card installed in a VXI chassis, a computer implemented on a PXI card installed in a PXI chassis, or other types of embodiments. The elements of a computer not necessary to understand the present invention have been omitted for simplicity.

The computer 102 includes at least one central processing unit or CPU 160 which is coupled to a processor or host bus 162. The CPU 160 may be any of various types, including a x86 processor, e.g., a Pentium class; a PowerPC processor; a CPU from the SPARC family of RISC processors; as well as others. Main memory 166 is coupled to the host bus 162 by means of memory controller 164. The main memory 166 may store one or more computer programs or libraries according to one embodiment of the present invention, e.g., routing management software. The main memory 166 also stores operating system software as well as the software for operation of the computer system, as well known to those skilled in the art.

The host bus 162 is coupled to an expansion or input/output bus 170 by means of a bus controller 168 or bus bridge logic. The expansion bus 170 may be any type of bus, including, but not limited to, the PCI (Peripheral Component Interconnect) expansion bus, or the PXI (PCI extensions for Instrumentation) expansion bus, among others. The expansion bus 170 includes slots for various devices such as the data acquisition board 114 (of FIG. 1B), a GPIB interface card 122 which provides a GPIB bus interface to the GPIB instrument 112 (of FIG. 1B), and a reconfigurable instrument 120. Note that as used herein, the term "reconfigurable instrument" refers to an instrument with one or more of:

1) a processor and memory which is capable of being configured by a user or software program; and/or 2) reconfigurable logic, such as an FPGA (Field Programmable Gate Array).

For more information on a reconfigurable instrument which includes an embedded processor and embedded memory, please see U.S. Pat. No. 6,173,438 which is hereby incorporated by reference in its entirety as though fully and completely set forth herein. For more information on a reconfigurable instrument which includes reconfigurable hardware, e.g., an FPGA, please see U.S. Pat. No. 6,219,628 which is hereby incorporated by reference in its entirety as though fully and completely set forth herein. The computer 102 may further comprise a video display subsystem 180 and hard drive 182 coupled to the expansion bus 170.

Figure 3:
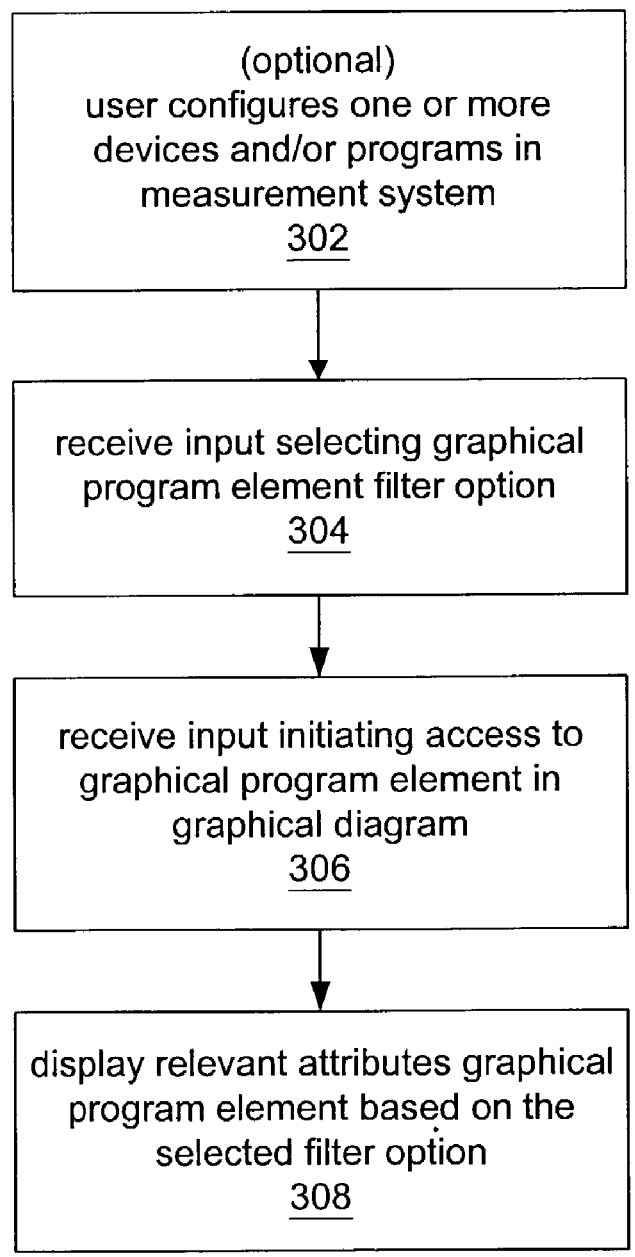
FIG. 3 is a flowchart of a method for filtering graphical program elements, according to one embodiment.

FIG. 3—Method for Filtering Graphical Elements

FIG. 3 flowcharts one embodiment of a method for filtering attributes of a graphical program element in a graphical diagram, e.g., a graphical program or a configuration diagram. It should be noted that in various embodiments, some of the steps may be performed in a different order than shown, or may be omitted. Additional steps may also be performed as desired. It should also be noted that the attribute filtering method described herein is also applicable to graphical program elements in any other application as well, including scientific, engineering, medical, financial, control, vision, and entertainment applications, among others.

As FIG. 3 shows, in 302, a user may optionally configure one or more resources, e.g., devices, programs and/or data in a measurement system. It should be noted that for illustration purposes, the method is described in the context of a measurement system, but that the method may also be used in any other type of system, as well. Thus, in this example, the one or more configured resources may be measurement devices, as described above with reference to FIGS. 1A–1C. In one embodiment, at least one of the one or more devices may be a virtual instrument, i.e., a software based device.

In 304, input may be received, e.g., from the user, selecting or specifying a graphical program element filter option. For example, in one embodiment, a graphical user interface (GUI) may be displayed presenting a plurality of property node filter options, as described in detail below with reference to FIG. 5A. Of course, other graphical program elements are also contemplated, such as a palette of icons, a menu, an access node (e.g., a read node, write node, invoke node, or other method node), and a property page, among others. In this example, the GUI may receive the user input selecting one of the presented property node filter options.

In 306, input may be received initiating access to the graphical program element, e.g., the property node, in the graphical diagram. For example, in one embodiment, the user may "left-click" the property node with a mouse or other pointing device, as is well known in the art, or may click once on the property node to select it, then select a menu item to access the property node attributes. In another embodiment, the input may initiate access to a palette of icons representing various components of the system, or to a properties page for presenting and/or modifying parameters for one or more components of the system.

In an embodiment where the graphical program element is a palette, the GUI may receive user input initiating access to the palette, such as a left-click on a palette icon in the graphical diagram with a mouse, or selection of an item from a menu. The attributes of the palette, in this case, one or more icons representing resources of the system, may then be displayed based on the selected filter option. The icons presented may then be selectable by the user for various operations, e.g., configuration of the resources associated with the icons, or, in an embodiment where the filtered icons represent proposed resources for the system, the icons may be selectable by the user to initiate a purchase/order of the resources from a vendor, i.e., to acquire the proposed resources.

Then, in 308, relevant attributes of the graphical program element may be displayed based on the selected filter option. Examples of displaying relevant property node attributes are shown with reference to FIGS. 5C and 5D, and described below. It should be noted that the phrase "relevant attributes" refers to those attributes associated with the graphical program element (type) included in the graphical diagram after the appropriate filtering has been applied. In other words, the graphical program element has associated with it a particular subset of all possible attributes, based on the type of the element. For example, the property node type, e.g., triggering, input, output, etc., may be used to restrict the presented attributes to those corresponding to that type. These attributes may then be filtered in accordance with the selected filtering option, possibly restricting the attributes further. The filtered attributes may then be displayed.

In an embodiment where the graphical program element is a palette of icons, each icon may represent a software program, a device, and/or data, for the measurement system. The icons presented may depend upon the filter options selected in 304, e.g., if the filter option indicates that only icons representing hardware devices are to be shown, then only those icons may be displayed to the user or presented to other aspects of the system. As another example, if the filter option indicates that proposed hardware and software components of the system are to be displayed, then only those icons representing proposed hardware and software may be presented in the GUI, i.e., hardware and software which has been determined to be needed by the system but which has not yet been acquired and/or installed. In yet another embodiment, where the graphical program element is a properties page, the parameters or controls displayed on the properties page may be filtered based on a filter option.

Similarly, in an embodiment where the graphical program element is an invoke or method node the attributes may comprise actions which may be taken on a corresponding resource, e.g., a configured hardware device, rather than parameters, such as, for example, setting an interrupt. In the same way that property nodes can be filtered based on configuration, these node attributes (actions) may also be filtered.

FIGS. 4A–4D, described below, flowchart various embodiments of step 308, illustrating examples of the process for several different filtering options. FIGS. 5A–5D illustrate various embodiments of the display of filtered property node attributes by the GUI for several different filtering options.

FIGS. 4A–4D—Filtering and Displaying Property Node Attributes

FIGS. 4A–4D flowchart in more detail various aspects of the method of FIG. 3, described above, corresponding to three different filtering options. Although three filtering options are described herein, it should be noted that other filtering options for displaying attributes of graphical program elements are also possible, and are not meant to be excluded. In other words, the options described are intended to be exemplary, and other filtering options, although not described herein, are considered to be in the spirit of the present invention.

Figure 4A:
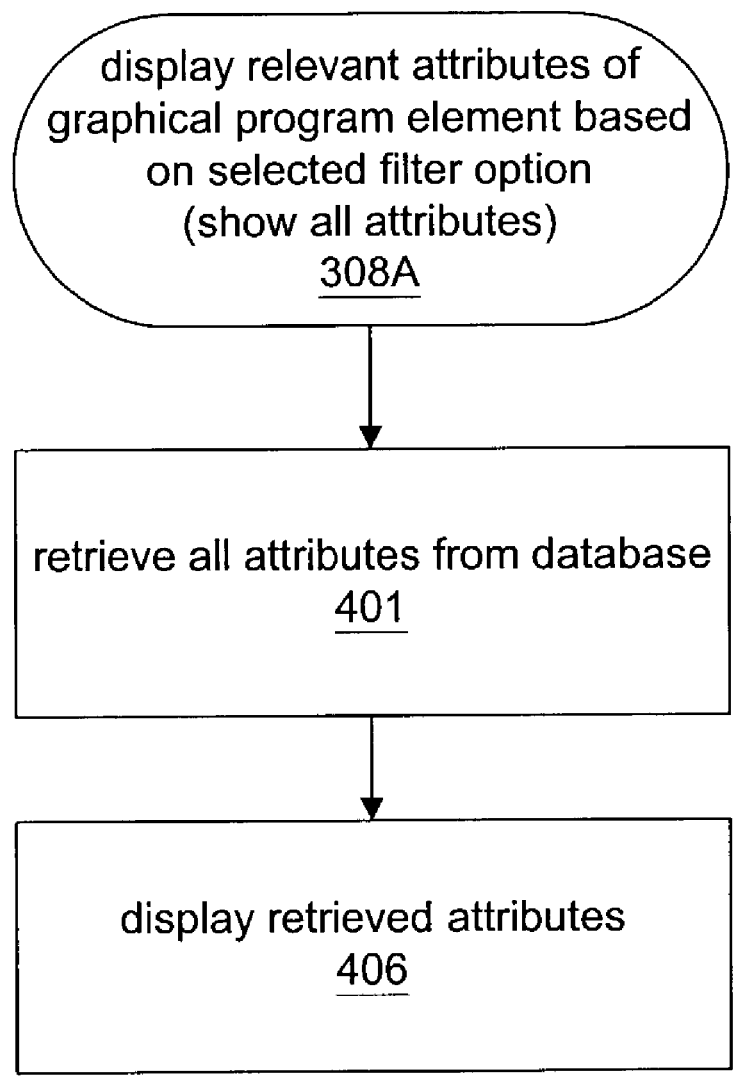
FIGS. 4A–4D are flowcharts of various embodiments of the filtering process of the method of FIG. 3.

FIG. 4A flowcharts a method for displaying attributes of the graphical program element in accordance with a selected filter option which specifies that all attributes of the graphical program element are to be displayed. As FIG. 4A shows, in 401, the method may retrieve all attributes associated with the graphical program element, e.g., from a database or file. In one embodiment, a complete or global list of attributes (i.e., attributes for all graphical program elements) may be retrieved from a database, such as a hardware database stored on the computer system 102 or a second computer system, i.e., a server computer, coupled to the host computer system 102. The global list of attributes may be traversed, and those attributes associated with the graphical program element, e.g., a property node, or with the graphical program element type, e.g., a property node type P, returned for display.

In 406, the attributes associated with the graphical program element may be displayed. For example, in the case above where the user left-clicks the graphical program element, a pop-up display may be presented showing the attributes returned in 401. Examples of pop-up displays of property node attributes for various filtering options are described below with reference to FIGS. 5A–5D.

Figure 4B:
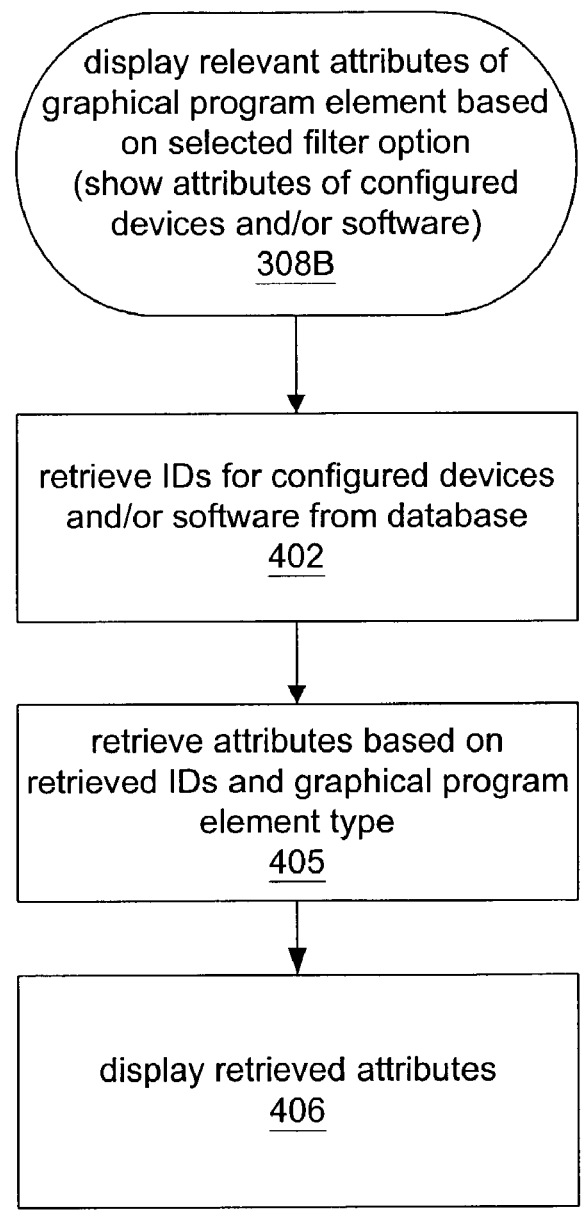

FIG. 4B flowcharts one embodiment of a method for displaying attributes of the graphical program element in accordance with a selected filter option which specifies that attributes of the graphical program element associated with all configured resources in the system are to be displayed. For example, if devices A, B, and C are configured in the system, and the graphical program element is of type P, then the option specifies that all attributes are to be displayed which are associated with any of the devices A, B, and C, and which are also associated with graphical program elements of type P.

As FIG. 4B shows, in 402, identifier information (IDs) for configured resources in the system may be retrieved from a database, such as the hardware database mentioned above.

Then, in 405, attributes associated with the configured resources and the graphical program element type may be retrieved. In one embodiment, the method may first retrieve the attributes associated with each device ID, and merge the attributes to generate a list of attributes associated with any of the devices. The method may then traverse the list of attributes, selecting those attributes associated with the graphical program element, e.g., of type P, and return the selected attributes for display. Finally, in 406, the returned attributes may be displayed, as described above.

Figure 4C:
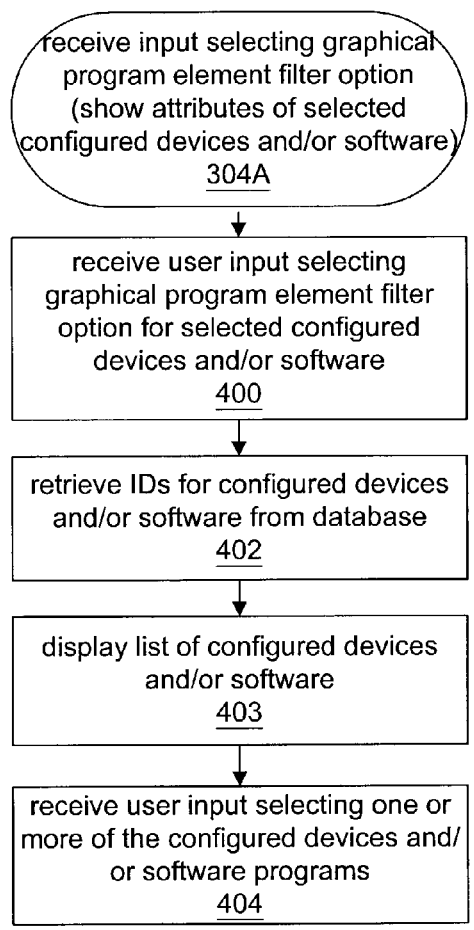
Figure 4D:
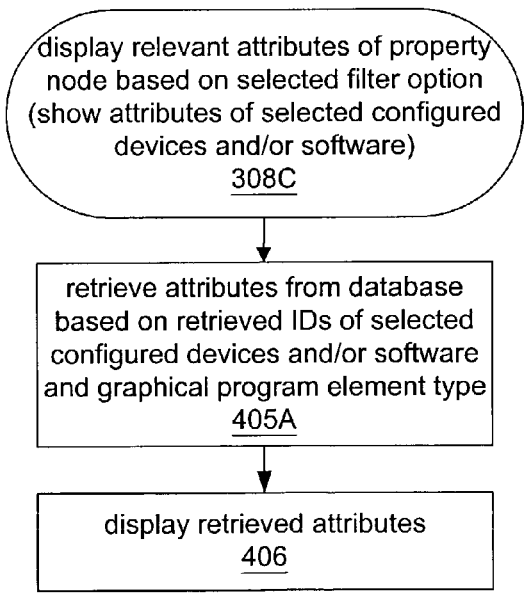

FIGS. 4C and 4D are flowcharts of a method of displaying attributes of the graphical program element in accordance with a selected filter option which specifies that attributes of the graphical program element associated with selected configured resources in the system are to be displayed. More specifically, FIG. 4C flowcharts an embodiment of a method of receiving input selecting a filter option which specifies that attributes of the graphical program element associated with selected configured resources in the system are to be displayed, and FIG. 4D flowcharts the subsequent steps involved in displaying the relevant attributes, according to one embodiment.

As indicated in FIG. 4C, in 400, user input may be received selecting the graphical program element filter option specifying that attributes of the graphical program element associated with selected configured resources in the system are to be displayed. In 402, IDs for configured resources in the system may be retrieved from a database, such as the hardware database mentioned above. Then, in 403, a list of the configured resources may be displayed based on the retrieved IDs, for example, in a GUI.

In 404, user input may be received selecting or specifying one or more of the configured resources. For example, the GUI may receive input from a mouse or other pointing device selecting one or more of the configured resources. In another embodiment, step 400 may be performed after step 404. In other words, the user may select the graphical program element filter option after one or more of the configured resources have been selected.

As mentioned above, FIG. 4D flowcharts an embodiment of a method of displaying attributes of the graphical program element in accordance with a selected filter option which specifies that attributes of the graphical program element associated with selected configured resources in the system are to be displayed, where the IDs of the selected configured resources have already been retrieved (e.g., in 402 of FIG.

4C, described above). As indicated in FIG. 4C, in 405A, attributes associated with the selected configured resources may be retrieved based on retrieved IDs of the selected configured resources and the graphical program element type. Note that in this embodiment, the IDs for the selected configured resources were previously retrieved in 402 of FIG. 4C, described above. In one embodiment, the method may first retrieve the attributes associated with each device ID (of the selected configured resources), and merge the attributes to generate a list of attributes associated with any of the selected devices. The method may then traverse the list of attributes, selecting those attributes associated with the graphical program element, e.g., of type P, and return the selected attributes for display.

In yet another embodiment, an option may be presented to the user specifying that attributes of the graphical program element associated with selected offline resources of the system are to be displayed. In other words, rather than selecting from configured resources of the system, the method may allow for selection from resources (hardware and/or software) which are not yet configured in the system. For example, the offline resources may comprise "proposed" resources for a task, where the proposed resources are indicated based on a task specification. As another example, the offline resources may include any or all resources which are available to the user, but which have not been configured in the user's system. It is noted that presentation of offline resources necessitates that information related to the offline resources be available to the method. In one embodiment, the computer system 102 may access a resource database, e.g., the National Instruments hardware and software catalog, and present the available resources to the user. The method may determine which of the resources are currently configured on the system and omit these resources from the presentation. In this embodiment, IDs for the offline resources may be retrieved from the resource database, and a list of the offline resources may be displayed based on the retrieved IDs, for example, in the GUI. As described above, the user may select one or more of the presented resources, and the method may return the attributes for the selected resources for display.

Finally, in 406, the returned attributes may be displayed, as described above.

In one embodiment, if the configured resources change, i.e., if one of the configured resources is removed from the system, if a new device is added, or if an FPGA has been reconfigured, after the filter option has been selected (e.g., as described above with reference to FIG. 4C), the attribute list may remain unchanged until the graphical program element filter options are presented again to the user. In other words, after a configuration change in the system, the method may update or re-build the attribute list upon invocation of the control for selecting the graphical program element filter options. In another embodiment, the attributes may be updated or re-built once the user has invoked the filter options control and indicated that the option selection is done, e.g., by clicking on an "OK" button. In yet another embodiment, the attribute list may be updated automatically upon reconfiguration of the system, i.e., a change in software and/or hardware resources of the system. The updated attributes may then be displayed in accordance with the current selected filtering option.

It is noted that changing the configuration of an FPGA or other programmable hardware element may be considered to be replacement of one device (the FPGA as initially configured) with a second device (the FPGA as subsequently configured), thus, the attributes presented to the user may change appropriately based on the configuration of the FPGA.

Similarly, switching between a hardware resource and a software resource, e.g., when an FPGA implements the functionality of a software resource or vice versa, may be considered to be a device replacement, and so the attributes presented to the user may change appropriately based on the replacement resource. Thus, in an example where a target for a VI is switched from hardware to software, attributes such as IRQs which were displayed in the hardware case may be omitted in the software based configuration of the system.

In one embodiment, if the updated configuration of the system is incompatible with the selected filtering option, a warning or error may be returned. For example, if an FPGA has been reconfigured, and the current filtering option specifies presentation of an attribute of the FPGA that is no longer valid, a message may be returned indicating the invalid attribute, and optionally, the configuration change which led to the incompatibility.

In one embodiment, the IDs for each device may be stored in individual data dictionaries (DD) in the hardware database. When the user left-clicks to select attributes from the graphical program element, the method may retrieve a list of attribute IDs. Depending on the filter settings the method may either return an empty list (if the selected option is option 2 (Show All Attributes)) or a unique list of attribute IDs. This may be accomplished by querying the DD of each device in the configured or selected list of devices for the attribute IDs and then merging the lists. In one embodiment, if an invalid attribute ID is received, the method may simply ignore the ID. In this embodiment, the return of an empty list may be used to indicate to the system that all attributes of the graphical program element are to be retrieved, and the system may then retrieve a global or complete list of attributes, traverse the list, and return only those attributes which are associated with the graphical program element. In this way, the processing involved with retrieving the attributes of every possible device and merging the (possibly overlapping) attributes into a single list may be avoided.

In one embodiment, once the merged list of attributes is generated, the list may be cached. Then, when subsequent displays of attributes are invoked, the cached list of attributes (e.g., attribute IDs) may be retrieved and traversed to select those attributes associated with the graphical program element type. The cached list may be updated whenever the filter option changes, whenever the system configuration changes, i.e., when a device is added or removed from the system, and/or whenever the user selects a different set of configured resources. In one embodiment, when the filter option changes, and/or whenever the system configuration changes, a "dirty bit" or its equivalent may be set indicating that the cached list should be updated when possible, as is well known to those skilled in the art. The list may then be updated, for example, when the user next invokes the filter options GUI. It should be noted that in one embodiment where the cached list is used, step 402 may be omitted, in that the attributes associated with the configured resources may have already been retrieved and stored in the list.

FIGS. 5A–5D—Display of Property Node Attributes

Figure 5A:
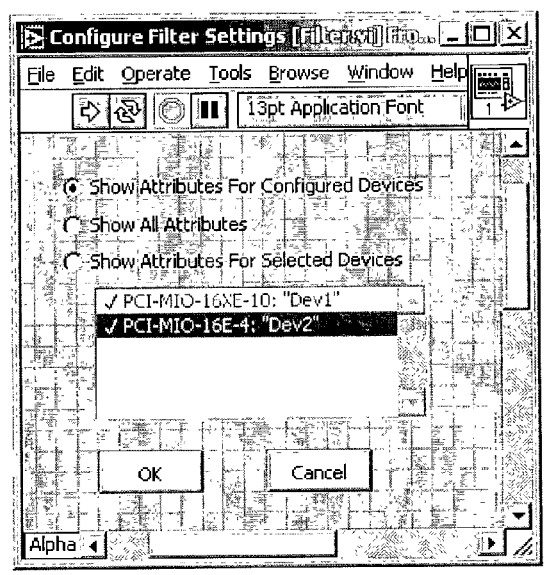
FIGS. 5A–5D illustrate the display of property node attributes, according to various embodiments.
Figure 5B:
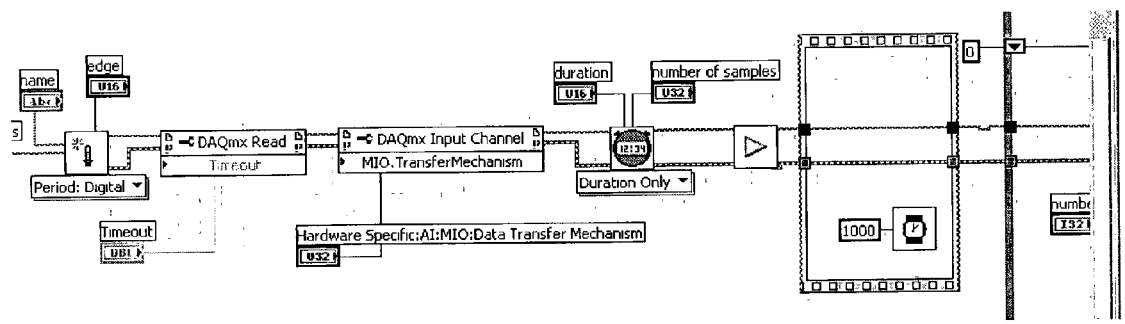
Figure 5C:
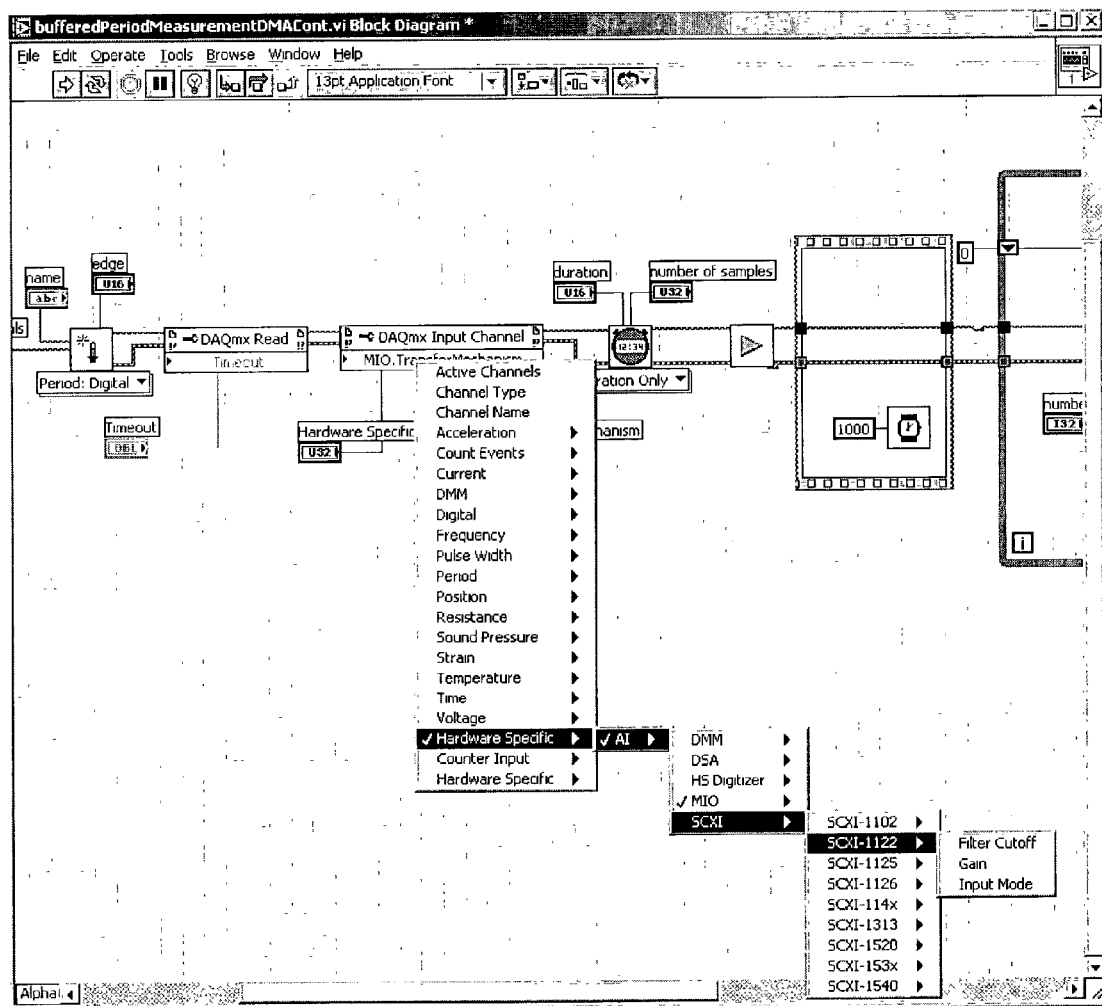
Figure 5D:
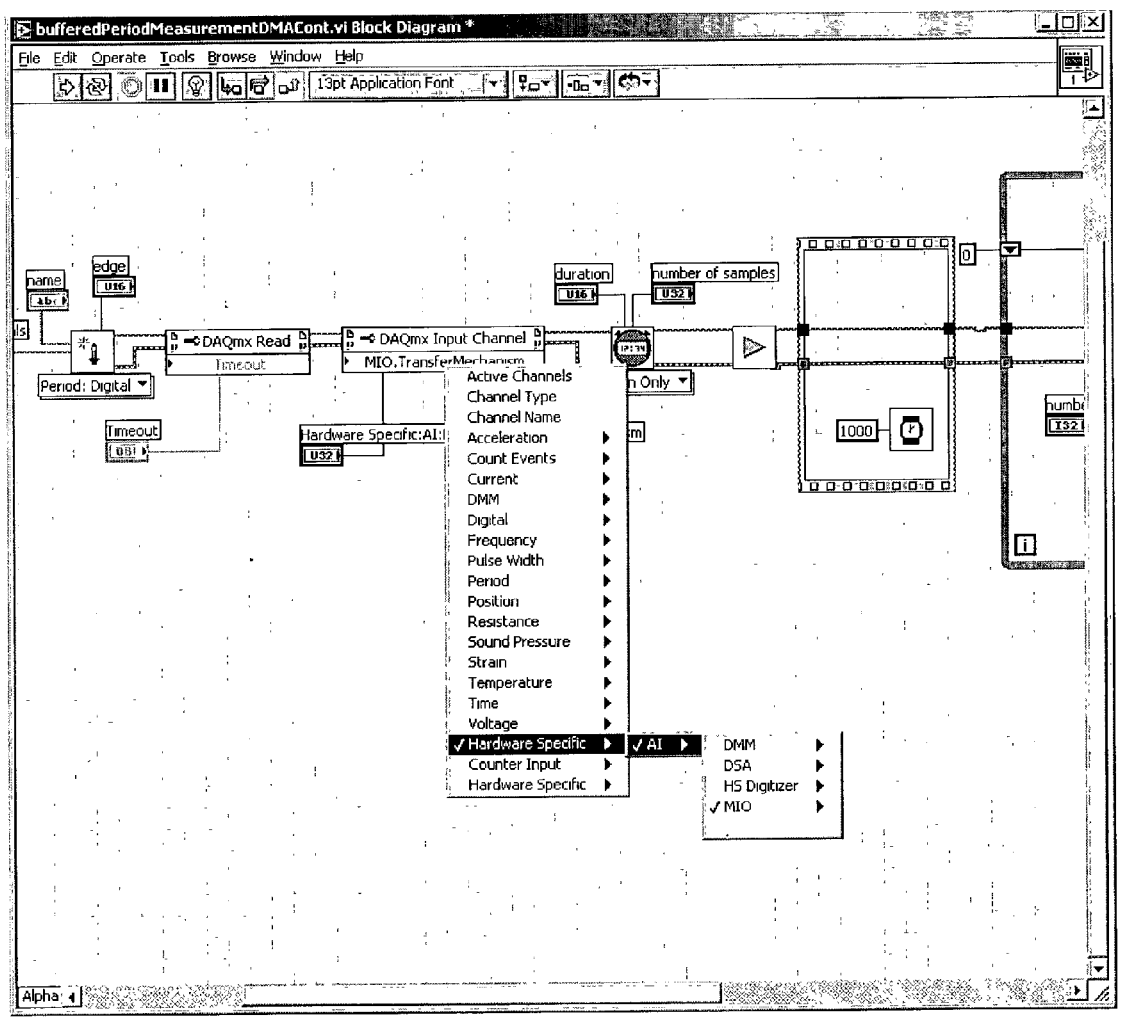

FIGS. 5A–5D illustrate various graphical displays related to the above method as applied to property nodes. It is noted that although the examples illustrated in FIGS. 5A–5D relate to property nodes, other graphical program elements, e.g., menus, property pages, and palettes, among others, are also contemplated. FIG. 5A illustrates one embodiment of a GUI for selecting one of several options for filtering the attributes of a property node in a graphical program. FIG. 5B illustrates part of an example graphical program with two property nodes. FIGS. 5C and 5D illustrate displays of property node attributes for two different filter options, according to one embodiment. It is noted that the graphical displays shown in FIGS. 5A–5D are also applicable for displaying attributes of property nodes (or other graphical elements) in a configuration diagram.

As FIG. 5A shows, a GUI (or other control/display means) may be displayed which presents two or more property node filtering options to the user. In this embodiment, three radio buttons are shown presenting three respective filtering options. The three options in this embodiment comprise the following: 1) show attributes for configured devices, as described above with reference to FIG. 4B; 2) show all attributes, as described above with reference to FIG. 4A; and 3) show attributes for selected devices, as described above with reference to FIGS. 4C and 4D.

As FIG. 5A also shows, a list of configured devices may be displayed, e.g., by the GUI. This list may be used to specify the selected configured devices for filter option 3.

Turning now to FIG. 5B, a portion of an example graphical program, also referred to as a block diagram, is shown. In this example program, a DAQmx Read property node is wired to a channel named "abc" and to another property node labeled DAQmx Input Channel, which is itself wired to a clock or timer node. As described above, in one embodiment, the attributes for a property node may be accessed by left-clicking on the node, thereby invoking a display of the relevant attributes, as shown in FIGS. 5C and 5D.

FIG. 5C illustrates an example of the display of attributes for the DAQmx Input Channel property node in the graphical program of FIG. 5B, according to one embodiment. In this example, filter option 2 has been selected, indicating that all attributes associated with the property node are to be displayed. As FIG. 5C shows, in this example, left-clicking the property node may invoke a pop-up display or menu which displays a plurality of attributes. Note that the first three attributes in the pop-up display, namely Active Channels, Channel Type, and Channel Name are atomistic, in that they cannot be expanded into sub-menus. The selection of any of the remainder of the attributes displayed, marked by arrows, may invoke a subsequent pop-up display or menu presenting further attribute selection options, as shown. These displays may continue to cascade until the user selects an atomistic attribute, at which time the attribute may be configured for any of various uses, including, for example, input, output, read, write, and reset, among others. Note that in this example, although there are no SCXI signal conditioning devices included in the system and/or graphical program, the attributes displayed include an SCXI attribute option which expands (in the subsequent pop-up menu) to display nine different SCXI devices. Thus, all of the DAQmx Input Channel property node attributes are displayed, irrespective of what devices are configured in the system, as the selected filter option indicated.

FIG. 5D illustrates an example of the display of attributes for the DAQmx Input Channel property node in the graphical program of FIG. 5B, according to another embodiment. In this example, filter option 1 (show attributes for configured devices), or filter option 2 (show attributes for selected devices), has been selected. Each of these options restricts the displayed options to those attributes which are associated with one or more of the configured devices, as well as the property node. As FIG. 5D shows, in this example, the plurality of attributes shown in the pop-up displays does not include the SCXI option and devices shown in FIG. 5C, because there are no SCXI devices configured in this system, as indicated by the selected filter option.

Example Use Cases:

In some cases, a selected option may be invalid for a given context. In one embodiment, these invalid option selections may be detected by the system, and a more suitable option automatically selected. Below are described several use cases illustrating invalid options and example responses.

Use Case #1

User has no configured devices and decides to select either option 1 (show attributes for configured devices), or option 3 (show attributes for selected devices). In this case since there are no devices configured, the system may display a warning box indicating that the option is invalid, and the option may be set to option 2 (show all attributes).

Use Case #2

User has two devices (A & B) configured and the user selects option 2 (show all attributes). However, the user then deselects all the devices from the list. In this case a warning may be displayed indicating that the option is invalid, and the option may be set to option 1 (show attributes for configured devices).

Use Case #3

User has 2 devices configured, device A and device B, and then uninstalls device A. The user then configures the filter. In this case the configured devices list (see FIG. 5A) may be refreshed and may only show device B. If the user has a VI with property nodes for device A, then the only attributes which may be displayed for device A are those in common with device B, as indicated by the selected filter option. The user may also not see any attributes of device A other than those shared with device B if a new property node is added which relates to device A. A similar situation occurs if the user adds another device C, in which case device C may be added to the configured devices list, and its attributes displayed.

In another embodiment, if the user has a VI with property nodes for device A and device A is no longer configured in the system, the GUI may display some visual aid suggesting that the attributes (specific to device A) are for non-installed devices. For example, the attributes which are filtered out may be displayed anyway, but "grayed out", as is known in the art. In this embodiment, all of the attributes of device A may be displayed, yet attributes which are filtered out may be easily ignored by a user.

Figure 6A:
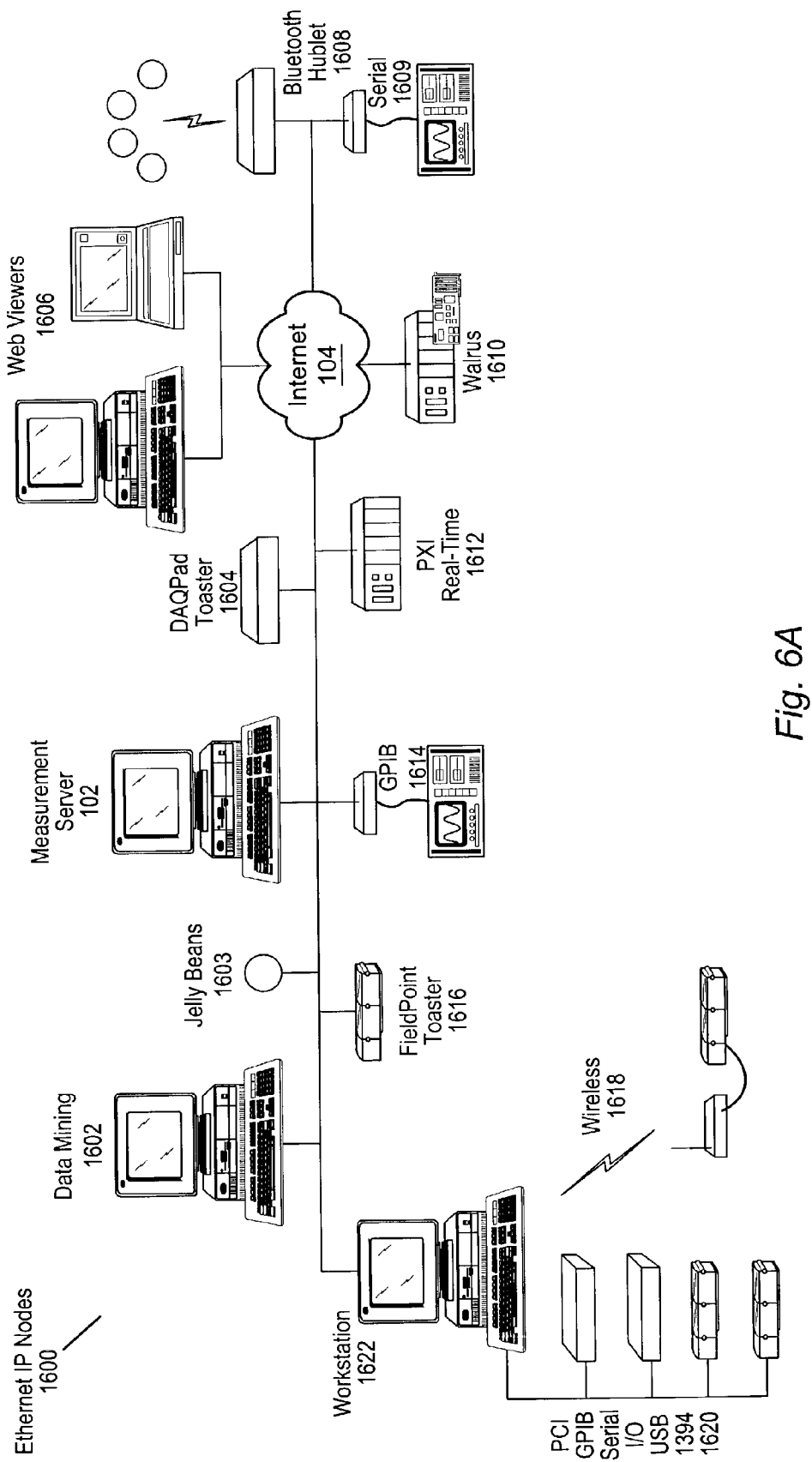
FIGS. 6A–6C illustrate example configuration diagrams, according to one embodiment.
Figure 6B:
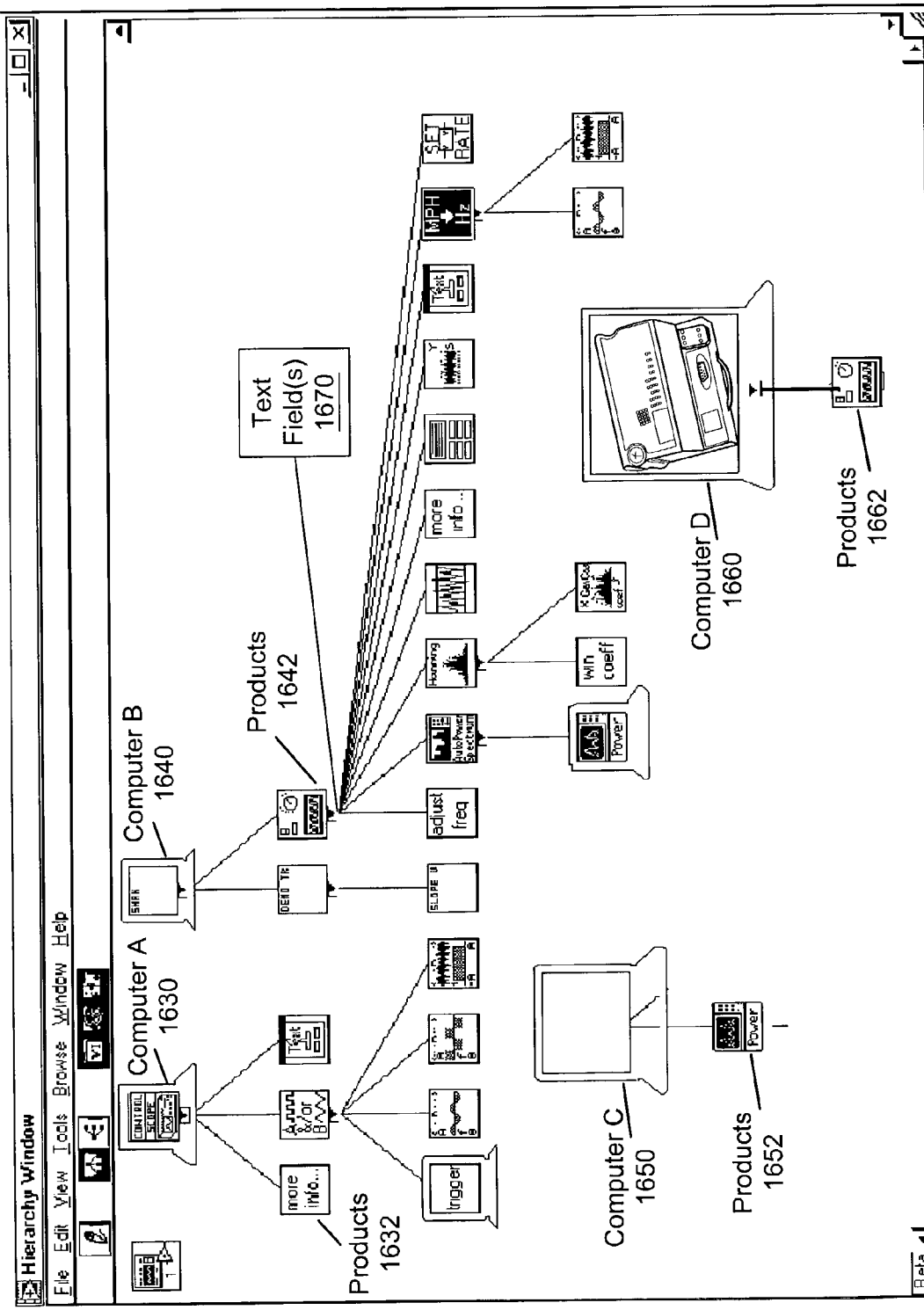

FIGS. 6A and 6B—Example Configuration Diagrams

FIGS. 6A and 6B illustrate example configuration diagrams for a system, such as a measurement system, according to one embodiment. As FIG. 6A shows, in one embodiment, the configuration diagram includes device icons corresponding to all detected devices. Alternatively, the computer system 102 may display the configuration diagram with only the devices selected in step 404 of FIG. 4C. As described above, the device icons each preferably have an appearance that visually indicates the type of device. The configuration diagram may display connections between the various device icons to visually indicate how the devices are coupled to each other. These connections may be automatically displayed, or created by the user, or both. As described below, the connections displayed between the devices may each have an appearance that visually indicates the type of connection. The configuration diagram may also include program icons corresponding to programs, as well as other elements described herein. The device and program icons are collectively referred to as resource icons.

In one embodiment, the configuration diagram may present different views, such as an entire system view, a subsystem view, an individual device view, a program relationship view, etc. Thus the user can select different options to display the configuration diagram with different views or different levels of granularity.

As described above, the configuration diagram may include or display device icons that represent the various devices in the system. Each of the device icons preferably has an appearance which corresponds to the device it represents. This allows the viewer to easily view and consider what devices are present in the distributed system. FIG. 6A is a configuration diagram in which a plurality of devices in a networked measurement system are shown, including connections between the devices. As FIG. 6A shows, in this example, a number of computers or workstations, namely, a data mining computer 1602, a measurement server 102, web viewers 1606, and a workstation 1622 are coupled through a network 104 to each other and a variety of other devices and/or instruments, including, for example, GPIB instrument 1614, PXI real-time instrument 1612, FieldPoint Toaster 1616, DAQPad Toaster 1604, and Bluetooth hublet 1608, among others. Thus, in a distributed system which comprises two or more devices connected to each other, such as through a network, a serial or parallel bus, or through wireless means, etc., the system may display a device icon for each of the devices present in the system. For example, a computer system 102 may be represented by a device icon that has the appearance of a computer system, as shown. In a similar manner, other device icons may each have an appearance which is similar to the appearance of the device it represents.

As FIG. 16A also shows, the configuration diagram may include or display connections ("connection icons") such as lines, that are displayed between the various device icons to show the interrelationship or coupling between the respective devices. In this example, the devices are interconnected over the network (the Internet) 104, each comprising a respective Ethernet IP Node 1600. The displayed connections may thus correspond to couplings between the plurality of devices. In one embodiment, the connections that are displayed may be context sensitive to indicate the type of data or phenomena connected between the devices. In other words, the displayed connections between respective device icons have an appearance to visually indicate a type of connection between devices corresponding to the respective device icons. For example, the displayed connections may have an appearance that varies according to one or more of color, size or shading to indicate the type of connection between the devices. For example, the diagram may graphically distinguish between a serial connection 1609 and a wireless connection 1618, as indicated. The appearance of the respective connections may indicate whether the connection is a network connection, internal bus connection, external parallel bus connection, external serial bus connection (e.g., USB or IEEE 1394) or a wireless connection. The appearance of the respective connections may also, or instead, indicate the type of data or material flow between devices. In another embodiment, the configuration diagram may include labels displayed proximate to the connections to visually indicate types of connection, as illustrated by serial connection 1609 and wireless connection 1618.

The user may at least partially create or assemble the configuration diagram, or the configuration diagram may at least partially be automatically or programmatically created, or both. In one embodiment, the configuration diagram may at least partly be automatically or programmatically created by the computer system 102 based on an automatic detection of devices coupled to the computer system 102. For example, the computer system 102 may automatically (programmatically) detect devices present in the measurement system and automatically (programmatically) generate and display a corresponding configuration diagram. The configuration diagram may also be created at least partly based on manual user input. For example, the user may manually drag and drop device icons from a palette or menu to create the configuration diagram.

In one embodiment, the computer system 102 may automatically detect devices and/or one or more couplings between devices present in the system. The computer system 102 may then automatically display one or more device icons and connections between respective device icons corresponding to the one or more one or more couplings between devices automatically detected in the distributed system. The connections between device icons that are automatically displayed may be displayed with an appearance indicating the type of detected connection, as described above.

In one embodiment, the user may manually connect device icons on the configuration diagram, such as by using a pointing device. For example, in creating or modifying a configuration diagram, the user may associate, e.g., drag and drop, or otherwise connect, a first device icon to a second device icon. For example, the user may use a pointing device (e.g., a mouse), and may possibly use a "wiring tool" icon on the display, to connect a first device icon to a second device icon. This may cause a connection, e.g., a wire, to appear between the device icons to indicate a relationship between the two (or more) device icons. The connection that is displayed between two device icons may be context sensitive. In other words, the connection that is displayed or created on the display may have a context or appearance that is associated with the types of devices that are being connected. Alternatively, or in addition, the connection that is displayed or created on the display may have a context or appearance that is associated with the type of physical connection (e.g., data or material flow) between the respective devices.

In a measurement application, the device icons may represent the various measurement devices present in the system, such as those shown in FIGS. 1A–1C. For example, there may be device icons present for any one or more of the various measurement or automation devices shown in FIGS. 1A–1C. Thus, as one example, where a computer system is coupled to a PXI chassis that includes a plurality of PXI instrument cards comprised in the chassis, the configuration diagram may include a device icon which represents the computer system, and a device icon which represents each of the respective PXI instruments comprised in the PXI chassis. The configuration diagram may also optionally include a device icon which represents the PXI chassis, with further device icons comprised in the PXI chassis device icon representing each of the respective PXI instrument cards. As another example, where one or more smart sensors are present in the measurement system, icons may be present which represent each of the various smart sensors. In a machine vision application, device icons may be present for a host computer system 102, an image acquisition board 134, and a camera 132, which may be a smart camera as desired. Thus, the configuration diagram graphically displays a plurality of device icons which represent the devices that are present in the system, for which the user is desiring to configure or create an application.

In one embodiment, the configuration diagram may also include icons which represent software products, i.e., programs and/or data, used by the measurement system, referred to as software product icons. FIG. 6B is an example of a configuration diagram which includes icons for a number of computers and related software products. For example, computer A 1630 has software products 1632 stored and/or installed, computer B 1640 has software products 1642, computer C 1650 has software products 1652, and computer D 1660 has software products 1662. As FIG. 6B also shows, in one embodiment, software products themselves may include other software products which may also be shown in the configuration diagram. In other words, the configuration diagram may illustrate components of software products, in addition to the software products. As mentioned above, in one embodiment, user input to a device or software product icon, such as double-clicking on a computer icon, may result in the display of icons representing stored or installed components, e.g., software products or component devices, of the device or software product, thus, the information presented by the configuration diagram may expand (or contract) based on user input. It should be noted that although the configuration diagram of FIG. 6B does not illustrate the interconnections of the hardware in the system, i.e., computers A–D, in various embodiments, a configuration diagram may illustrate both hardware interconnectivity, as shown in the configuration diagram of FIG. 6A, and the software products (and/or devices) associated with, e.g., stored and/or installed in, the hardware in the system, as shown in FIG. 6B.

The user may perform various operations using the configuration diagram. Alternatively, or in addition, the configuration diagram may be used to display or illustrate operations performed by the computer system 102.

For example, the user may select various software product icons, e.g., program icons, on the display (within or outside the configuration diagram) and associate them with various device icons (or other program icons) contained in the configuration diagram. This operation of associating program icons with device icons (or other program icons) in the configuration diagram may operate to deploy, either immediately or when the user selects "apply" or the equivalent, the respective programs on the various devices which correspond to the device icons (or within a program relationship or hierarchy represented by the program icons). Deploying a program may comprise moving or copying the program from the server to a respective device, or moving or copying the program between devices, among other types of operations. Various other deployment operations are also contemplated.

The operation of a user associating program icons with device icons (or other program icons) in the configuration diagram may be performed with "drag and drop" techniques, menu-based techniques, dialog box techniques, speech recognition techniques, or other techniques. This operation of associating program icons with device icons (or other program icons) in the configuration diagram operates to deploy, or cause to be deployed, the respective programs on the various devices which correspond to the device icons. Thus, stated another way, if the user selects a first program icon and associates (e.g., drags and drops) this first program icon on to a first device icon which represents a first device, and the user optionally selects "apply", this operates to deploy a first program corresponding to that graphical program icon onto the first device which corresponds to that first device icon. This provides a greatly simplified mechanism for deploying programs on various devices in a distributed system.

As another example, the configuration diagram may be animated to display various deployments of software products (programs and/or configuration information) to various devices in the system, as mentioned above. For example, if the server 102 is deploying a program to a device in the system, the configuration diagram may display the corresponding program icon moving from a server icon representing the server to a device icon corresponding to the device on which the program is being deployed. As another example, if the program is deployed from and by the client computer system to the device, the configuration diagram may display the corresponding program icon moving from a computer icon representing the client computer to a device icon corresponding to the device.

The configuration diagram is preferably updated in real time as the user (or computer 102) performs iconic or deployment operations, such as the deployment of hardware or software. Thus the configuration diagram may display an iconic relationship view of the distributed programs and distributed devices as the user associates (e.g., drags and drops) the program icons on the device icons, the program icons on other program icons, the device icons on other device icons, etc., or as the server deploys programs. For example, as the user drags and drops program icons (e.g., from the configuration diagram) on to various device icons on the configuration diagram, the system may operate to display the relationship (e.g., hierarchy) of programs proximate to, e.g., underneath, the respective device icon to where they have been deployed, as displayed in FIG. 6B.

In one embodiment, when the user associates program icons with various device icons contained in the configuration diagram, the configuration diagram is immediately updated accordingly, but this operation of associating does not operate to deploy programs at that time. Rather, the user may be required to select an "apply" feature for the deployment to actually occur. This allows the user to view various configuration diagram options before a deployment actually occurs. In another embodiment, a preview window may be employed to allow the user to view proposed changes to a configuration diagram prior to the change being committed or applied.

In one embodiment, when the user provides input to purchase a hardware product from a vendor, the client computer system configuration diagram may display a device icon, e.g., a virtual device icon, where the virtual device icon has an alternate or modified appearance (possibly "grayed out") to indicate the device icon represents a virtual or non-present device. Program icons that are deployed to this virtual device icon may be stored in the computer system and deployed to the device when the device is received and installed in the system.

Figure 6C:
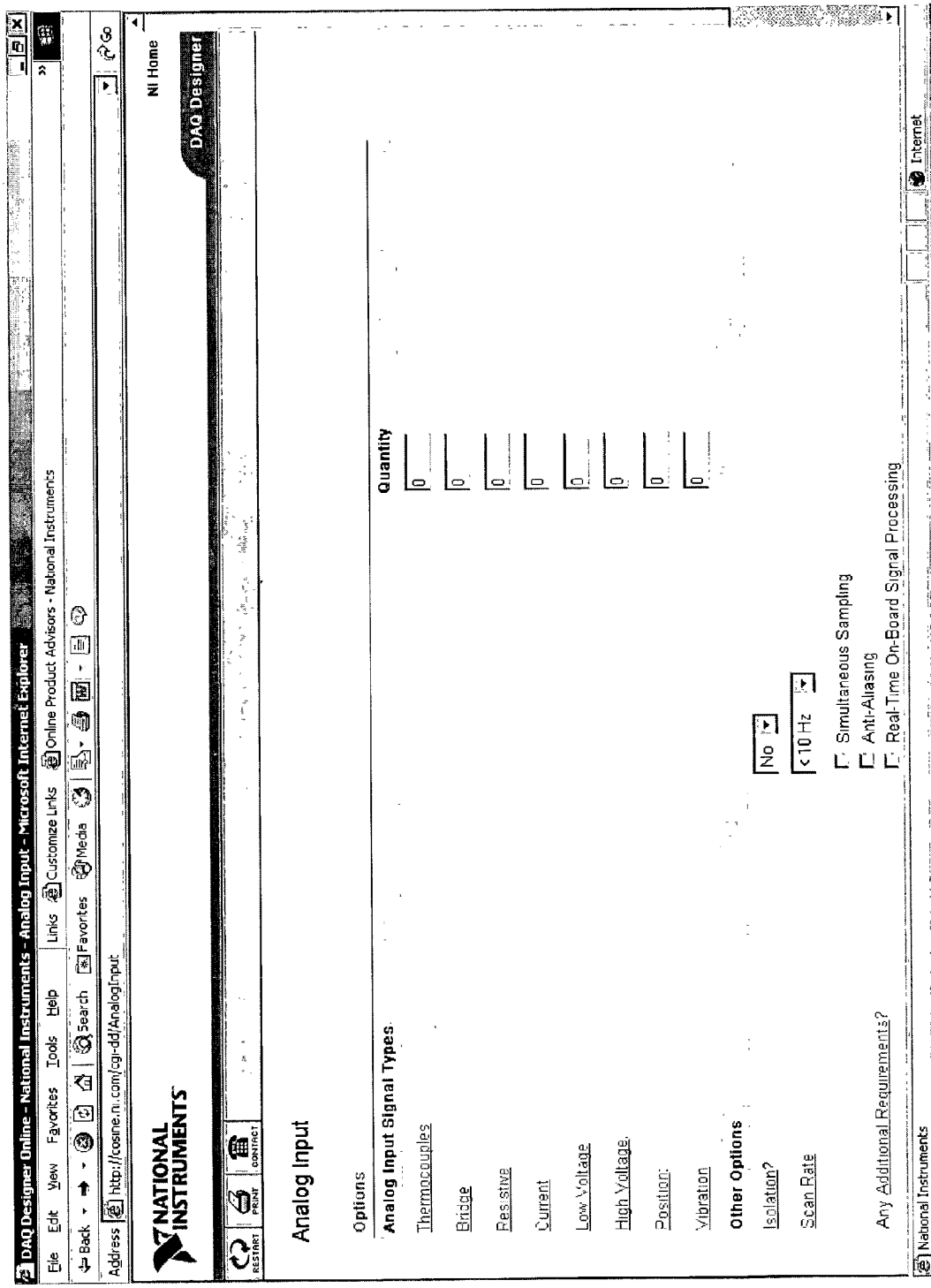

In addition to device icons and software product icons, the configuration diagram may include one or more textual information or numeric fields 1670, as also shown in FIG. 6B. The text field(s) 1670 may display configuration information related to a device or software product, or may allow the user to modify configuration data for the device or software product. One embodiment of a textual display and entry panel is illustrated in FIG. 6C, described below.

In one embodiment, user input to a device or software product icon, such as, for example, right-clicking on a device or software product icon, may result in the display of configuration information, e.g., the text field 1670. For example, if the use right-clicks on an instrument icon, a pop-up window may be displayed showing the instruments current configuration parameters. In one embodiment, a GUI panel may be displayed which not only presents the parameter values, but also allows the user to modify the values. FIG. 16C illustrates an example configuration panel for displaying and configuring analog input parameters for a measurement system or task. As FIG. 6C shows, one or more parameter names and corresponding entry fields may be displayed in the configuration panel. It is noted that configuration panels (or other GUI constructs) may be provided for both hardware devices and software programs and data. Thus, the configuration diagram may also function as an active configuration interface to the measurement system. For more detailed information on configuration diagrams, please see U.S. application Ser. No. 10/113,987 titled "A Configuration Diagram Which Displays a Configuration of a System" filed Apr. 1, 2002, which was incorporated by reference above.

Example: VI Reference

Another example application of the techniques disclosed herein relates to VI access and operation through VI references, i.e., as opposed to hard-coded instantiations of the VI. More specifically, the techniques described above may be applied to the use of VI references for accessing VI properties and executing the VI, as described below.

Figure 7A:
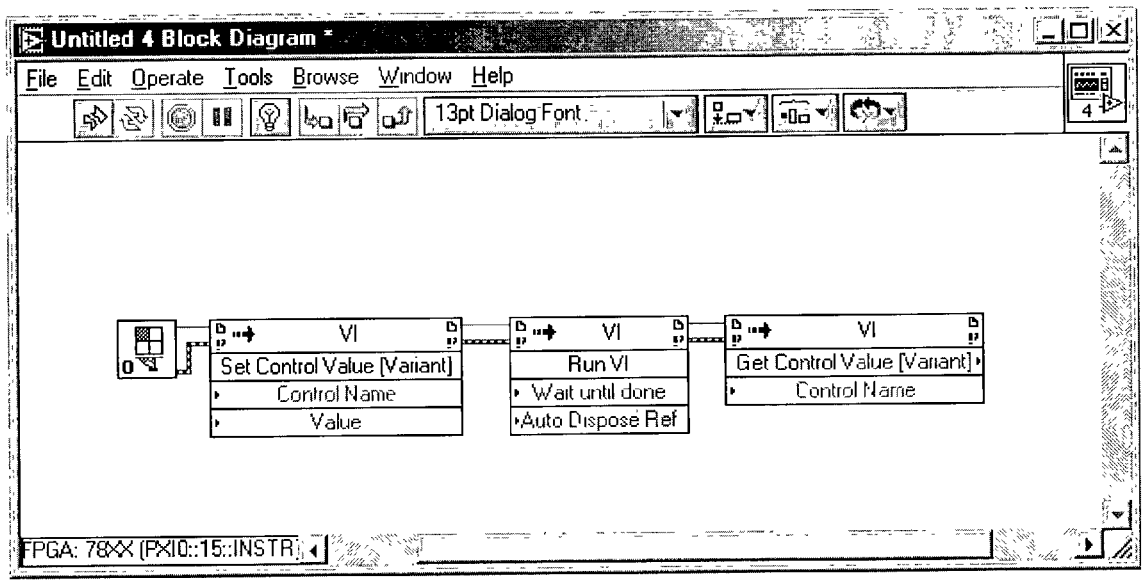
FIGS. 7A–7B illustrate accessing a VI, according to the prior art.
Figure 7B:
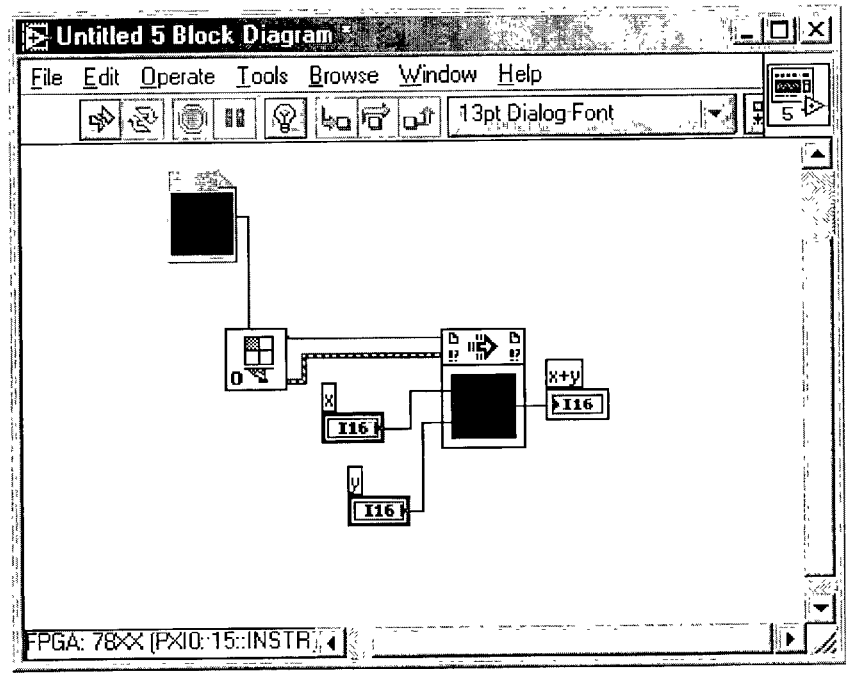

FIGS. 7A–7B—VI Reference (Prior Art)

FIGS. 7A and 7B illustrate two prior art approaches to VI access and operation through a VI reference. FIG. 7A illustrates the use of method nodes to get and set control and indicator values asynchronously, as well as to run or execute the VI. As FIG. 7A shows, in this example, an open reference node, labeled "O", is connected to a "set" method node, a "run" method node, and a "get" method node. The "run" operation may take place at any point independent of the control (set/get) methods, so the user can interact with the VI without being constrained to a single call. However, the get and set methods are fully run time dynamic, and therefore the data type of a control or indicator (or even its existence) may not be guaranteed at edit time, i.e., the data types may not be determined until run time. In addition, this dynamic behavior adds a degree of overhead that may preclude optimal performance of the system.

FIG. 7B illustrates the second prior art method of referenced VI invocation, which utilizes a call-by-reference node. As FIG. 7B shows, in this example the open reference node (labeled "O"), is coupled to a call-by-reference node, denoted by an arrow on the node icon. The call-by-reference node is also shown connected to three numeric terminals which may access the referenced VI's attributes at run time. In this case, a single node sets all control values, runs the VI, waits for the VI to finish, and returns all indicator values. As FIG. 7B also shows, the open reference node is also connected to a connector pane attribute types node (top left) which provides type information (but not names) for attributes comprising the public interface for the referenced VI. The connectors of the call-by-reference node replicate the connector pane of the VI, using the actual data types instead of variants or flattened strings. However, it is noted that this is still a dynamic call, as the node is strictly typed to just the connector pane, instead of a particular VI. Any VI with the same connector pane layout can be called from that call-by-reference node. In other words, any VI with the same public interface data types may be called from the call-by-reference node, increasing the likelihood of erroneous operation of the system.

FIGS. 8A–8G, described below, illustrate an alternative approach to the use of VI references using the filtering techniques presented herein.

FIGS. 8A–8G—Example Application: Static VI Reference

FIGS. 8A–8G illustrate filtering of graphical elements as applied to VI references. In particular, an approach is described which facilitates interaction with controls and indicators of a VI running asynchronously, while the values read and written are strictly typed to the data type of the control. This approach may eliminate the overhead associated with dynamic invocation, and may thus improve efficiency of the system.

This approach may be particularly useful in communicating with FPGA targeted VIs, where the overhead of dynamic calls in relation to the number of parameters passed in fast control loops entails significant overhead. Additionally, FPGA VI's often have more controls and indicators than are supported by a connector pane, thereby preventing the use of the call by reference node for those attributes not included in the connector pane. However, it should be noted that the approach described below is not limited to FPGA applications, but is broadly applicable to multi-platform development and use, providing a generic means for communication with graphical programs running on a variety of platforms with improved code readability.

FIGS. 8A–8G illustrate a new framework of obtaining and using VI references. In contrast to the prior art methods described above with reference to FIGS. 7A and 7B, these new references may be statically bound to a specific VI, rather than being completely dynamic or typed to a connector pane. As prior art VI references do not propagate sufficient information to specify all controls and indicators of the VI and adapt to changes in that VI, a new refnum (reference number) type may be necessary for implementation of the method.

Figure 8A:
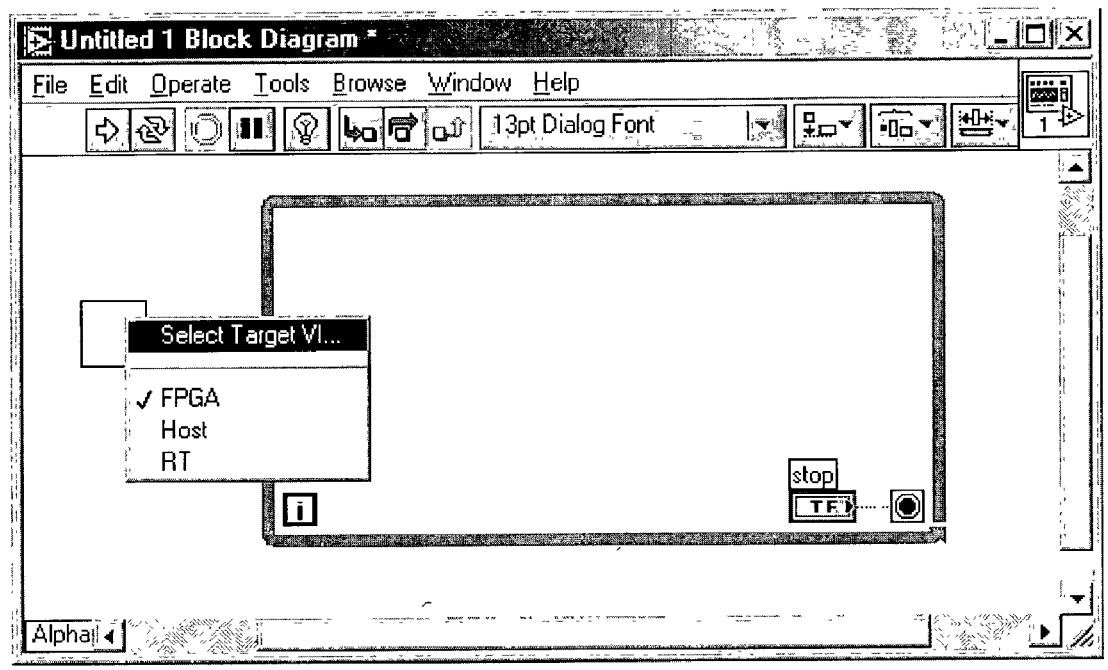
FIGS. 8A–8G illustrate the use of static VI references, according to one embodiment of the invention.

Turning now to FIG. 8A, an exemplary graphical program, i.e., block diagram, is shown which includes an execution loop with a stop terminal. Outside the loop, an open reference node may be added to open the reference, similar to the prior art open reference node; however, in accordance with the present invention, all configuration may be made from the node's context menu and associated dialogs, rather than from wired inputs to the node. This ensures that the configuration is defined at edit time, rather than at run time, allowing the VI call to be statically bound to the VI.

As FIG. 8A shows, in one embodiment, after the open reference node has been placed in the block diagram, a target platform may be selected, i.e., the platform on which the VI should be opened. For example, in one embodiment, the user may "right-click" on the node icon, thereby invoking a pop-up menu presenting various typing options to the user. In another embodiment, the user may invoke the menu by different means, i.e., instead of right-clicking on the node icon, the user may invoke presentation of the target type options by clicking on a graphical element specifically provided for that purpose, e.g., a "typing" icon or menu in a task bar. The presented target platform options may include, but are not limited to, opening the VI reference on the local host machine, a remote machine on the network, or on a programmable hardware element, such as an FPGA. This information may be included in the refnum output of the node for use by other nodes in their respective configuration. In this example, the target platform type "FPGA" is shown selected. In one embodiment, a default target platform type may be provided by the node, e.g., the first listed target platform type. As FIG. 8A also shows, an option may also be presented for specification of a target VI. In other words, the user may be allowed to select the particular VI for reference by the open reference node, as shown in FIG. 8B, and described below.

Figure 8B:
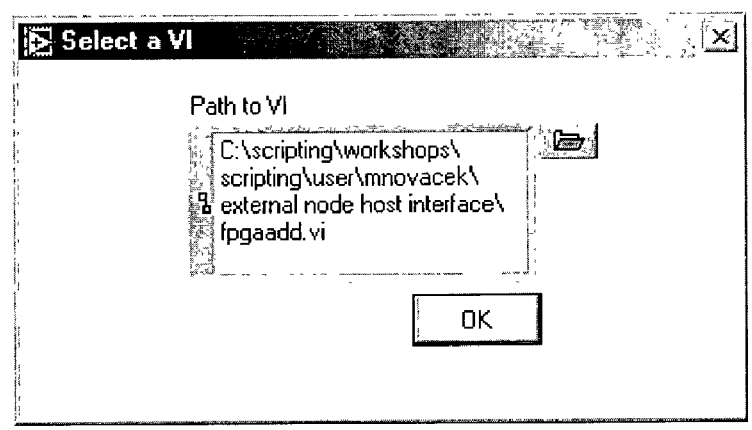

As FIG. 8B illustrates, in response to user input selecting the option to select a target VI for the open reference node, a graphical user interface, e.g., a dialog box, may be presented for receiving user input specifying the target VI. For example, a text entry field may be presented whereby the user may enter a path name for the desired target VI. In one embodiment, a browsing mechanism may be provided which allows the user to browse the system (or other networked systems) for the target VI, as shown.

In one embodiment, the open reference node may be configurable to run the VI as soon as it is open. In this usage, the controls and indicators of the VI may be accessed after the VI has started running. Alternatively, the open node may not run the VI and an additional node may be used to start the VI running after one or more values have been written to the controls. In this example, the user has selected an "FPGA add" VI, in accordance with the selected FPGA target platform. Thus, the open reference node has been typed at "edit time", and may thence be configured in the graphical program without the risks associated with run time typing.

Figure 8C:
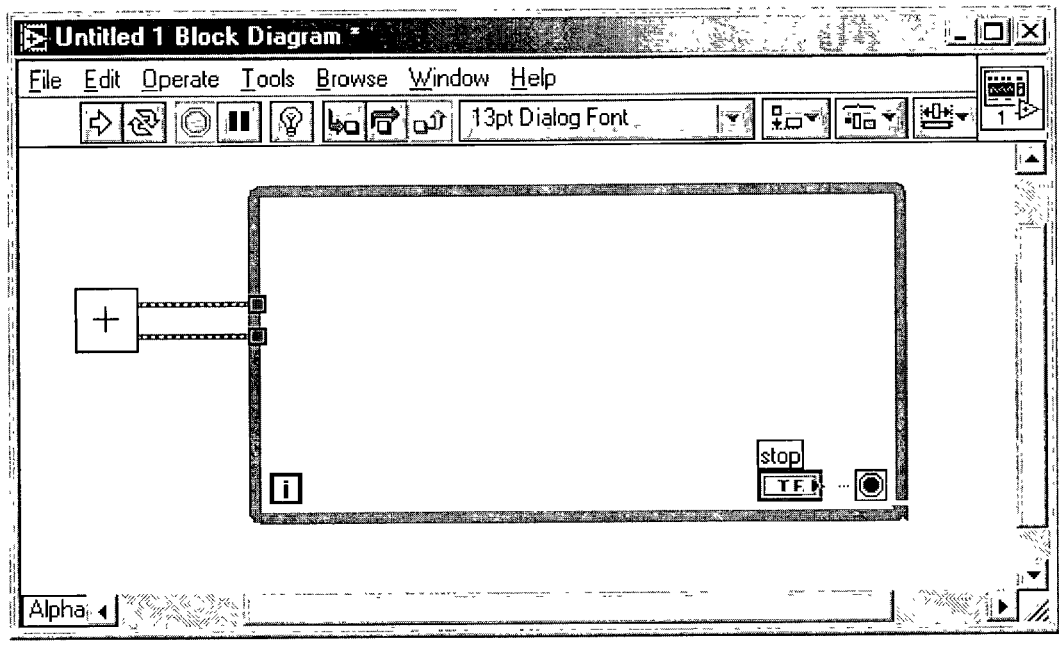

FIG. 8C illustrates the typed open reference node connected to the loop, e.g., by the user "wiring" the outputs of the node to the loop, as shown. As FIG. 8C shows, the node icon may be changed to reflect the referenced VI, i.e., the "add" function. In one embodiment, the output of this node may include a refnum (top wire) which is type specific to the VI, as well as an error terminal (bottom wire).

Figure 8D:
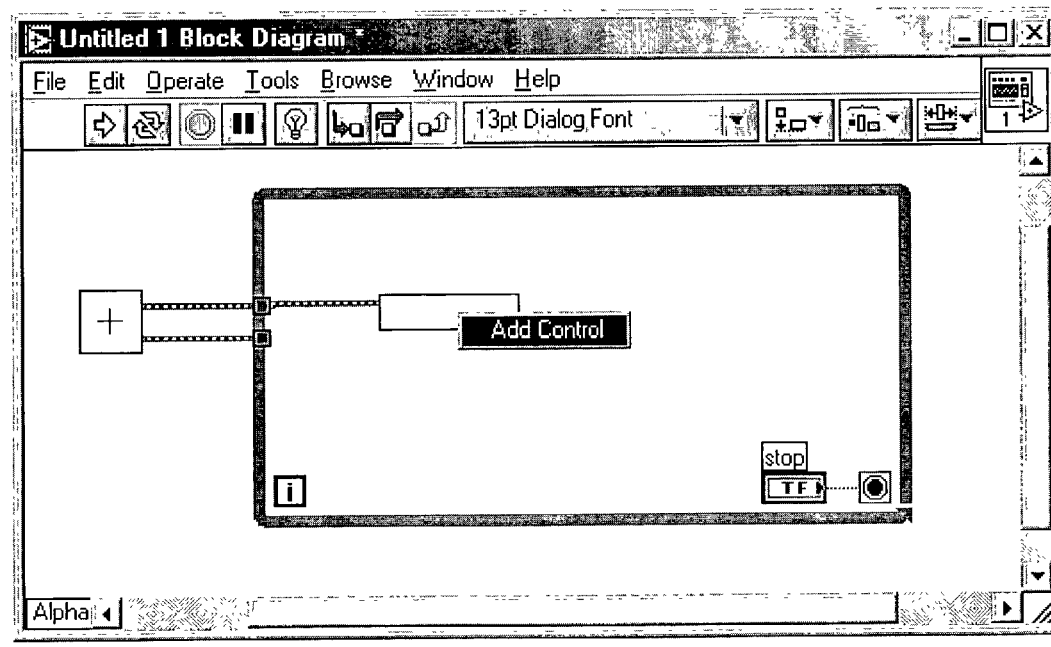

FIG. 8D illustrates the addition of an access node, such as a read, write, or property node, to the graphical program for accessing the controls and indicators of the referenced VI. When the refnum input of the access node is wired to the output of the open reference node, the access node may adapt to the type of the refnum, outputting the same refnum type and determining the controls/indicators that are valid for the currently selected VI. The access node may be configured from its context menu. Terminals may be added to the access node, and for each terminal the associated control on the target VI may be selected. Because the access node is coupled to the selected VI, any of the controls and indicators of the selected VI may be available, including those not on the connector pane (the public interface). The data type of each terminal is explicitly set to the type of the control, rather than simply a variant or flattened string.

Figure 8E:
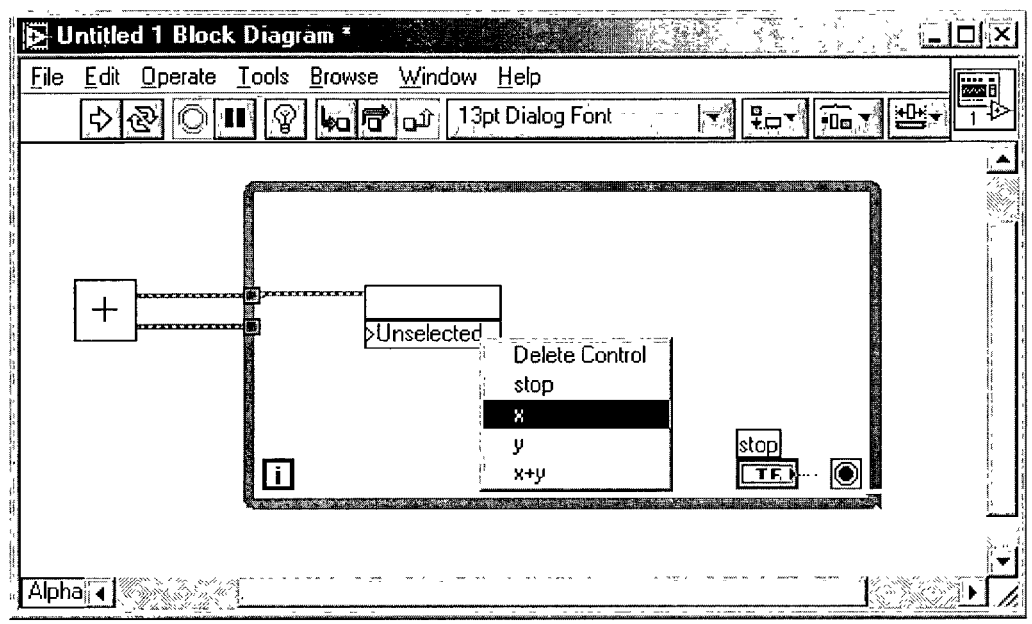

FIG. 8E illustrates the selection of an attribute for access by the access node. As FIG. 8E shows, the attributes presented by the access node have been filtered to include those attributes which correspond to the type of the selected VI, in this case, two arguments, x and y, and their sum, as well as a stop control and a delete option. In this example, the attribute "x" is shown selected. Further details of attribute access are shown in FIG. 8F, described below.

Figure 8F:
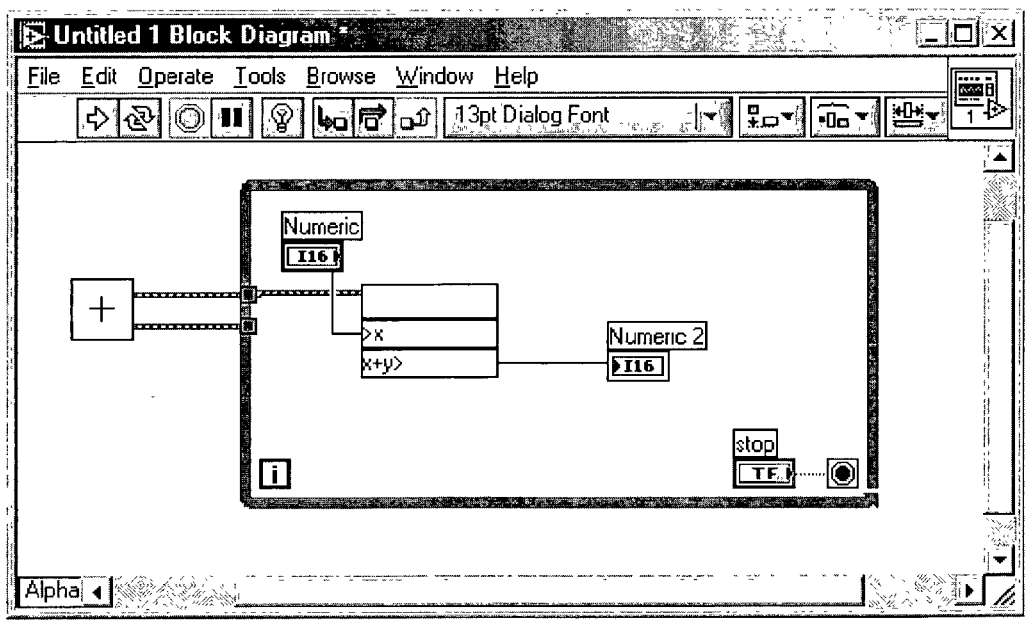

FIG. 8F illustrates numeric terminals for two of the attributes of the referenced VI, namely, a read of "x", and a write of "x+y", as shown. As may be seen, each of the attributes is typed as a 16-bit integer. These terminals may then be used by other nodes of the graphical program to respectively read and write the corresponding attributes of the referenced VI.

Figure 8G:
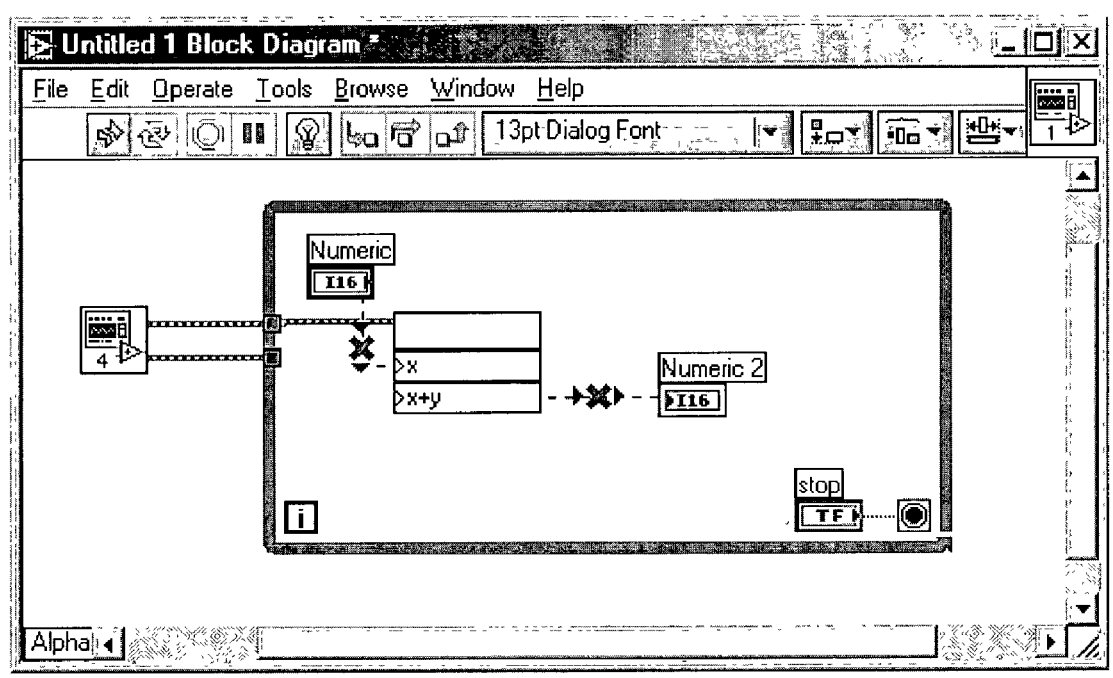

If the VI selection made on the open reference node is changed, the refnum output by that node may change appropriately. In response to this change in type, any access nodes (read, write, or property nodes) connected to the refnum terminal may change their respective refnum outputs and check the new refnum type against their selected controls. If any of the selected control names are no longer valid, the corresponding terminal may be removed from the node and the wire connected from that terminal may be invalidated, breaking the diagram, as FIG. 8G illustrates. In this manner, the user may never have an invalid configuration selected on their diagram. Thus, the static typing of the open reference node to that of the selected VI may prevent errors in the configuration of VIs in the graphical program which do not become apparent until run time. Additionally, the explicit selection of the target platform for the VI may provide a means for target specific syntax checking, thereby preventing incompatible VI/platform configurations. For further details on target specific syntax checking, please see U.S. application Ser. No. 10/177,553, titled "Target Specific Syntax Defining and Checking", which was incorporated by reference above.

Thus, various embodiments of the systems and methods described above may be used to simplify the configuration process for a user of a measurement system or any other system which employs graphical elements to configure a graphical diagram and/or controls and devices used by the graphical diagram. The graphical diagram may be a graphical program or a configuration diagram. More specifically, various embodiments of the systems and methods described herein allow a user to specify any of a variety of options for filtering the displayed attributes of a graphical programming element in the graphical diagram, thereby reducing the effort required by the user to configure controls and/or devices associated with the graphical element.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for configuring a graphical program, wherein the graphical program comprises a graphical program element, wherein the method operates in a system which includes one or more configured resources, the method comprising:
   receiving user input specifying a graphical program element filter option from a plurality of graphical program element filter options;
   receiving user input initiating access to the graphical program element; and
   displaying relevant attributes of the graphical program element based on the specified filter option, wherein the specified filter option indicates that attributes of the graphical program element associated with at least one of the one or more configured resources are to be displayed;
   wherein said displaying relevant attributes of the graphical program element comprises:
      retrieving attributes associated with said at least one configured resource;
      extracting one or more attributes associated with the graphical program element from the retrieved attributes, wherein the extracted attributes are asso ciated with said at least one configured resource and said graphical program element; and displaying said extracted attributes;

wherein said extracted attributes of the graphical program element are selectable by a user to configure the graphical program.

2. The method of claim 1, wherein said retrieving attributes associated with said at least one configured resource comprises retrieving said attributes associated with said at least one configured resource from a cache.

3. The method of claim 1, wherein said retrieving attributes associated with said at least one configured resource comprises retrieving said attributes associated with said at least one configured resource from a database.

4. The method of claim 1, further comprising:

changing a configuration of the system, wherein said changing comprises changing the configuration of said at least one configured resource;

retrieving updated attributes associated with said at least one configured resource;

extracting one or more attributes associated with the graphical program element from the retrieved updated attributes, wherein the extracted attributes are associated with said at least one configured resource and said graphical program element; and displaying said extracted attributes in accordance with the selected filter option.

5. The method of claim 4, wherein said at least one configured resource comprises a field programmable gate array (FPGA); and wherein said changing the configuration of said at least one configured resource comprises reconfiguring the FPGA.

6. The method of claim 1, further comprising:

changing a configuration of the system, wherein said changing comprises replacing said at least one configured resource with a second configured resource;

retrieving attributes associated with said second configured resource;

extracting one or more attributes associated with the graphical program element from the retrieved attributes, wherein the extracted attributes are associated with said second configured resource and said graphical program element; and displaying said extracted attributes.

7. The method of claim 6, wherein said replacing said at least one configured resource with a second configured resource comprises replacing a hardware resource with a software resource.

8. The method of claim 6, wherein said replacing said at least one configured resource with a second configured resource comprises replacing a software resource with a hardware resource.

9. A computer-readable memory medium which stores program instructions for filtering attributes for a graphical program element in a graphical program, wherein the graphical program operates in a system which includes one or more configured resources, wherein the program instructions are executable to perform:

presenting a plurality of graphical program element filter options to a user;

receiving user input selecting a graphical program element filter option from the plurality of graphical program element filter options;

receiving user input initiating access to the graphical program element; and displaying one or more attributes of the graphical program element based on the selected filter option, wherein the selected filter option indicates that attributes of the graphical program element associated with at least one of the one or more configured resources are to be displayed;

wherein said displaying one or more attributes of the graphical program element comprises:

retrieving attributes associated with the at least one configured resource;

extracting one or more attributes associated with the graphical program element from the retrieved attributes, wherein the one or more extracted attributes are associated with the at least one configured resource and the graphical program element; and displaying said one or more extracted attributes;

wherein said one or more attributes of the graphical program element are selectable by a user to configure the graphical program.

10. The computer-readable memory medium of claim 9, wherein said retrieving attributes associated with the at least one configured resource comprises retrieving said attributes associated with the at least one configured resource from a cache.

11. The computer-readable memory medium of claim 9, wherein said retrieving attributes associated with the at least one configured resource comprises retrieving said attributes associated with the at least one configured resource from a database.

12. The computer-readable memory medium of claim 9, wherein the program instructions are further executable to perform:

changing a configuration of the system, wherein said changing comprises changing the configuration of said at least one configured resource;

retrieving updated attributes associated with said at least one configured resource;

extracting one or more attributes associated with the graphical program element from the retrieved updated attributes, wherein the extracted attributes are associated with said at least one configured resource and said graphical program element; and displaying said extracted attributes in accordance with the selected filter option.

13. The computer-readable memory medium of claim 12, wherein said at least one configured resource comprises a field programmable gate array (FPGA); and wherein said changing the configuration of said at least one configured resource comprises reconfiguring the FPGA.

14. The computer-readable memory medium of claim 9, wherein the program instructions are further executable to perform:

changing a configuration of the system, wherein said changing comprises replacing said at least one configured resource with a second configured resource;

retrieving attributes associated with said second configured resource;

extracting one or more attributes associated with the graphical program element from the retrieved attributes, wherein the extracted attributes are associated with said second configured resource and said graphical program element; and displaying said extracted attributes.

15. The computer-readable memory medium of claim 14, wherein said replacing said at least one configured resource with a second configured resource comprises replacing a hardware resource with a software resource.

16. The computer-readable memory medium of claim 14, wherein said replacing said at least one configured resource with a second configured resource comprises replacing a software resource with a hardware resource.

17. A method for configuring a system, wherein the system includes a graphical diagram and one or more configured resources, and wherein the graphical diagram comprises a graphical element, the method comprising:
  receiving user input specifying a graphical element filter option from a plurality of graphical element filter options;
  receiving user input initiating access to the graphical element; and
  displaying relevant attributes of the graphical element based on the specified filter option, wherein said specified option indicates that attributes of the graphical element associated with at least one of the one or more configured resources are to be displayed;
  wherein said displaying relevant attributes of the graphical element comprises:
    retrieving attributes associated with said at least one configured resource;
    extracting one or more attributes associated with the graphical element from the retrieved attributes, wherein the extracted attributes are associated with said at least one configured resource and said graphical element; and
    displaying said extracted attributes;
  wherein said relevant attributes of the graphical element are selectable by a user to configure the system.

18. The method of claim 17, wherein said retrieving attributes associated with said at least one configured resource comprises retrieving said attributes associated with the selected at least one configured resource from a cache.

19. The method of claim 17, wherein said retrieving attributes associated with said at least one configured resource comprises retrieving said attributes associated with said at least one configured resource from a database.

20. The method of claim 17, further comprising:
  changing the configuration of the system, wherein said changing comprises changing the configuration of said at least one configured resource;
  retrieving updated attributes associated with said at least one configured resource;
  extracting one or more attributes associated with the graphical element from the retrieved updated attributes, wherein the extracted attributes are associated with said at least one configured resource and said graphical element; and
  displaying said extracted attributes in accordance with the selected filter option.

21. The method of claim 20,
  wherein said at least one configured resource comprises a field programmable gate array (FPGA); and
  wherein said changing the configuration of said at least one configured resource comprises reconfiguring the FPGA.

22. The method of claim 17, further comprising:
  changing the configuration of the system, wherein said changing comprises replacing said at least one configured resource with a second configured resource;
  retrieving attributes associated with said second configured resource;
  extracting one or more attributes associated with the graphical element from the retrieved attributes, wherein the extracted attributes are associated with said second configured resource and said graphical element; and
  displaying said extracted attributes.

23. The method of claim 12,
  wherein said replacing said at least one configured resource with a second configured resource comprises replacing a hardware resource with a software resource.

24. The method of claim 12,
  wherein said replacing said at least one configured resource with a second configured resource comprises replacing a software resource with a hardware resource.

25. A computer-readable memory medium which stores program instructions for filtering attributes for a graphical element in a graphical diagram, wherein the graphical diagram operates in a system which includes one or more configured resources, wherein the program instructions are executable to perform:
  presenting a plurality of graphical element filter options to a user;
  receiving user input selecting a graphical element filter option from the plurality of graphical element filter options;
  receiving user input initiating access to the graphical element; and
  displaying one or more attributes of the graphical element based on the selected filter option, wherein the selected filter option indicates that attributes of the graphical element associated with at least one of the one or more configured resources are to be displayed;
  wherein said displaying one or more attributes of the graphical element comprises:
    retrieving attributes associated with the at least one configured resource;
    extracting one or more attributes associated with the graphical element from the retrieved attributes, wherein the one or more extracted attributes are associated with the at least one configured resource and the graphical element; and
    displaying said one or more extracted attributes;
  wherein said one or more attributes of the graphical element are selectable by a user to configure the system.

26. The computer-readable memory medium of claim 25, wherein said retrieving attributes associated with the at least one configured resource comprises retrieving said attributes associated with the at least one configured resource from a cache.

27. The computer-readable memory medium of claim 25, wherein said retrieving attributes associated with the at least one configured resource comprises retrieving said attributes associated with the at least one configured resource from a database.

28. The computer-readable memory medium of claim 25, wherein the program instructions are further executable to perform:
  changing a configuration of the system, wherein said changing comprises changing the configuration of said at least one configured resource;
  retrieving updated attributes associated with said at least one configured resource;
  extracting one or more attributes associated with the graphical element from the retrieved updated attributes, wherein the extracted attributes are associated with said at least one configured resource and said graphical element; and displaying said extracted attributes in accordance with the selected filter option.

29. The computer-readable memory medium of claim 28, wherein said at least one configured resource comprises a field programmable gate array (FPGA); and
wherein said changing the configuration of said at least one configured resource comprises reconfiguring the FPGA.

30. The computer-readable memory medium of claim 25, wherein the program instructions are further executable to perform:
changing a configuration of the system, wherein said changing comprises replacing said at least one configured resource with a second configured resource;
retrieving attributes associated with said second configured resource;
extracting one or more attributes associated with the graphical element from the retrieved attributes, wherein the extracted attributes are associated with said second configured resource and said graphical element; and
displaying said extracted attributes.

31. The computer-readable memory medium of claim 30, wherein said replacing said at least one configured resource with a second configured resource comprises replacing a hardware resource with a software resource.

32. The computer-readable memory medium of claim 30, wherein said replacing said at least one configured resource with a second configured resource comprises replacing a software resource with a hardware resource.

33. A computer-implemented method for configuring a graphical program, the method comprising:
displaying a plurality of interconnected nodes in the graphical program, wherein the plurality of interconnected nodes visually indicates functionality of the graphical program, wherein the plurality of interconnected nodes includes a first node;
receiving user input selecting a filtering option from a plurality of filtering options;
filtering a plurality of attributes of the first node in order to determine one or more relevant attributes of the first node to display based on the selected filtering option; and
displaying the one or more relevant attributes of the first node.

34. The method of claim 33, further comprising:
displaying the plurality of filtering options;
wherein said receiving user input selecting a filtering option comprises receiving user input selecting one of the displayed filtering options.

35. The method of claim 33,
wherein said filtering the plurality of attributes of the first node determines that a subset, but not all, of the plurality of attributes are relevant attributes based on the selected filtering option;
wherein said displaying the one or more relevant attributes of the first node comprises displaying the subset of the plurality of attributes.

36. The method of claim 33,
wherein the selected filtering option indicates that all of the attributes of the first node are relevant attributes to be displayed;
wherein said displaying the one or more relevant attributes of the first node comprises displaying all of the attributes of the first node.

37. The method of claim 33,
wherein the method operates in a system that includes one or more configured resources;
wherein the, plurality of filtering options includes one or more of:
a filtering option indicating that only attributes of the first node that are relevant to the configured resources are relevant attributes to be displayed; and/or
a filtering option indicating that only attributes of the first node that are relevant to selected ones of the configured resources are relevant attributes to be displayed.

38. The method of claim 33,
wherein the method operates in a system that includes at least one configured resource;
wherein the plurality of filtering options includes a first filtering option indicating that only attributes of the first node that are relevant to one or more of the configured resources are relevant attributes to be displayed;
wherein said receiving user input selecting a filtering option from the plurality of filtering options comprises receiving user input selecting the first filtering option;
wherein the one or more relevant attributes of the first node are determined based on the one or more configured resources.

39. The method of claim 38,
wherein said displaying the one or more relevant attributes of the first node comprises displaying a first one or more relevant attributes;
wherein the method further comprises:
changing a configuration of at least one of the one or more configured resources after said displaying the relevant attributes of the first node;
re-filtering the plurality of attributes of the first node after said changing the configuration of the at least one of the one or more configured resources, wherein said re-filtering the plurality of attributes determines a second one or more relevant attributes, wherein the second one or more relevant attributes is different than the first one or more relevant attributes; and
displaying the second one or more relevant attributes of the first node in response to said re-filtering the plurality of attributes of the first node.

40. The method of claim 33,
wherein the method operates in a system that includes one or more configured devices;
wherein the plurality of filtering options includes a first filtering option indicating that only attributes of the first node that are relevant to the configured devices are relevant attributes to be displayed;
wherein said receiving user input selecting a filtering option from the plurality of filtering options comprises receiving user input selecting the first filtering option;
wherein the one or more relevant attributes of the first node are determined based on the configured devices.

41. The method of claim 33, further comprising:
receiving user input selecting at least one attribute from the displayed relevant attributes of the first node; and
configuring the first node according to the selected at least one attribute.

42. The method of claim 33, wherein the first node comprises one of:
a property node;
an access node;
a reference node.

43. A computer-readable memory medium which stores program instructions for configuring a graphical program, wherein the program instructions are executable to perform:

displaying a plurality of interconnected nodes in the graphical program, wherein the plurality of interconnected nodes visually indicates functionality of the graphical program, wherein the plurality of interconnected nodes includes a first node;

receiving user input selecting a filtering option from a plurality of filtering options;

filtering a plurality of attributes of the first node in order to determine one or more relevant attributes of the first node to display based on the selected filtering option; and displaying the one or more relevant attributes of the first node.

44. A system for configuring a graphical program, the system comprising:

a memory storing program instructions; and a processor coupled to the memory;

wherein the program instructions are executable by the processor to perform:

displaying a plurality of interconnected nodes in the graphical program, wherein the plurality of interconnected nodes visually indicates functionality of the graphical program, wherein the plurality of interconnected nodes includes a first node;

receiving user input selecting a filtering option from a plurality of filtering options;

filtering a plurality of attributes of the first node in order to determine one or more relevant attributes of the first node to display based on the selected filtering option; and displaying the one or more relevant attributes of the first node.

45. A computer-implemented method for configuring a system, the method comprising:

displaying a plurality of graphical elements in a configuration diagram, wherein the graphical elements represent resources in the system, wherein the plurality of graphical elements includes a first graphical element;

receiving user input selecting a filtering option from a plurality of filtering options;

filtering a plurality of attributes of the first graphical element in order to determine one or more relevant attributes of the first graphical element to display based on the selected filtering option; and displaying the one or more relevant attributes of the first graphical element;

wherein the one or more relevant attributes of the first graphical element are selectable by a user to configure the system.

46. The method of claim 45, further comprising:

displaying the plurality of filtering options;

wherein said receiving user input selecting a filtering option comprises receiving user input selecting one of the displayed filtering options.

47. The method of claim 45, wherein said filtering the plurality of attributes of the first graphical element determines that a subset, but not all, of the plurality of attributes are relevant attributes based on the selected filtering option;

wherein said displaying the one or more relevant attributes of the first graphical element comprises displaying the subset of the plurality of attributes.

48. The method of claim 45, wherein the selected filtering option indicates that all of the attributes of the first graphical element are relevant attributes to be displayed;

wherein said displaying the one or more relevant attributes of the first graphical element comprises displaying all of the attributes of the first graphical element.

49. The method of claim 45, wherein the system includes one or more configured resources;

wherein the plurality of filtering options includes one or more of:

a filtering option indicating that only attributes of the first graphical element that are relevant to the configured resources are relevant attributes to be displayed; and/or a filtering option indicating that only attributes of the first graphical element that are relevant to selected ones of the configured resources are relevant attributes to be displayed.

50. The method of claim 45, wherein the system includes at least one configured resource;

wherein the plurality of filtering options includes a first filtering option indicating that only attributes of the first graphical element that are relevant to one or more of the configured resources are relevant attributes to be displayed;

wherein said receiving user input selecting a filtering option from the plurality of filtering options comprises receiving user input selecting the first filtering option;

wherein the one or more relevant attributes of the first graphical element are determined based on the one or more configured resources.

51. The method of claim 50, wherein said displaying the one or more relevant attributes of the first graphical element comprises displaying a first one or more relevant attributes;

wherein the method further comprises:

changing a configuration of at least one of the one or more configured resources of the system after said displaying the relevant attributes of the first graphical element;

re-filtering the plurality of attributes of the first graphical element after said changing the configuration of the at least one of the one or more configured resources, wherein said re-filtering the plurality of attributes determines a second one or more relevant attributes, wherein the second one or more relevant attributes is different than the first one or more relevant attributes; and displaying the second one or more relevant attributes of the first graphical element in response to said re-filtering the plurality of attributes of the first graphical element.

52. The method of claim 45, wherein the system includes one or more configured devices;

wherein the plurality of filtering options includes a first filtering option indicating that only attributes of the first graphical element that are relevant to the configured devices are relevant attributes to be displayed;

wherein said receiving user input selecting a filtering option from the plurality of filtering options comprises receiving user input selecting the first filtering option;

wherein the one or more relevant attributes of the first graphical element are determined based on the configured devices.

53. The method of claim 45, further comprising:
receiving user input selecting at least one attribute from the displayed relevant attributes of the first graphical element; and
configuring the system according to the selected at least one attribute.

54. The method of claim 45,
wherein the system comprises a measurement system;
wherein the graphical elements in the configuration diagram represent resources in the measurement system; and
wherein the configuration diagram is useable to configure the one or more resources in the measurement system to perform a measurement task.

55. A computer-readable memory medium which stores program instructions for configuring a system, wherein the program instructions are executable to perform:

displaying a plurality of graphical elements in a configuration diagram, wherein the graphical elements represent resources in the system, wherein the plurality of graphical elements includes a first graphical element;
receiving user input selecting a filtering option from a plurality of filtering options;
filtering a plurality of attributes of the first graphical element in order to determine one or more relevant attributes of the first graphical element to display based on the selected filtering option; and
displaying the one or more relevant attributes of the first graphical element;
wherein the one or more relevant attributes of the first graphical element are selectable by a user to configure the system.

* * * * *

UNITED STATES PATENT AND TRADEMARK OFFICE
CERTIFICATE OF CORRECTION

| | | |
|---|---|---|
| PATENT NO. | : 7,120,874 B2 | Page 1 of 1 |
| APPLICATION NO. | : 10/174347 | |
| DATED | : October 10, 2006 | |
| INVENTOR(S) | : Shah et al. | |

It is certified that error appears in the above-identified patent and that said Letters Patent is hereby corrected as shown below:

Column 34 Line 6, please delete "The method of claim 12," and substitute -- The method of claim 22 --;

Column 34 Line 10, please delete "The method of claim 12," and substitute -- The method of claim 22 --.

Signed and Sealed this

Twelfth Day of December, 2006

JON W. DUDAS
*Director of the United States Patent and Trademark Office*